(12) United States Patent
Shigeta et al.

(10) Patent No.: US 6,480,253 B1
(45) Date of Patent: Nov. 12, 2002

(54) LCD DEVICE HAVING ELECTRODES COMPRISING CONDUCTIVE RESIN OR CONDUCTIVE COLOR FILTER AND MANUFACTURING METHOD OF THE SAME

(75) Inventors: Mitsuhiro Shigeta, Kashiwa (JP); Hideki Uchida, Tokyo (JP); Masahiko Tomikawa, Funabashi (JP); Hisashi Akiyama, Kashiwa (JP); Nobuyuki Itoh, Noda (JP); Shuji Miyoshi, Kashiwa (JP)

(73) Assignees: Sharp Kabushiki Kaisha, Osaka (JP); The Secretary of State for Defence in Her Britannic Majesty's Government of the United Kingdom of Great Britain and Northern Ireland, Farnborough (GB)

( * ) Notice: Subject to any disclaimer, the term of this patent is extended or adjusted under 35 U.S.C. 154(b) by 0 days.

(21) Appl. No.: 09/362,281

(22) Filed: Jul. 27, 1999

(30) Foreign Application Priority Data

| Jul. 31, 1998 | (JP) | 10-218138 |
| Jun. 15, 1999 | (JP) | 11-167987 |

(51) Int. Cl.⁷ ...................... G02F 1/1343; G02F 1/1335
(52) U.S. Cl. ....................... 349/148; 349/106; 349/147
(58) Field of Search ................................ 349/106, 139, 349/147, 148, 172

(56) References Cited

U.S. PATENT DOCUMENTS

| 4,419,399 A | | 12/1983 | Ichikawa et al. ........... 428/215 |
| 4,639,088 A | * | 1/1987 | Suginoya et al. ........... 350/339 |
| 5,177,627 A | | 1/1993 | Ishiwata et al. .............. 359/68 |
| 5,248,576 A | * | 9/1993 | Yokoyama et al. ............. 430/7 |
| 5,358,810 A | * | 10/1994 | Yoshino ...................... 430/20 |
| 5,399,450 A | * | 3/1995 | Matsushima et al. .......... 430/7 |
| 5,644,371 A | * | 7/1997 | Koden et al. ................ 349/110 |

(List continued on next page.)

FOREIGN PATENT DOCUMENTS

| EP | 390569 | 10/1990 |
| GB | 2278204 | 11/1994 |
| JP | 4-55823 | 2/1992 |
| JP | 6-82619 | 3/1994 |
| JP | 09311213 | 12/1997 |

OTHER PUBLICATIONS

Patent Search Report, Oct. 7, 1999, GB9917501.0.
N.A. Clark et al., Appl. Phys. Lett. 36(11), pp. 899–901, Jun. 1, 1980, "Submicrosecond Bistable Electro–Optic Switching in Liquid Crystals".
U.S. patent application Ser. No. 09/217,162; filed on Dec. 21, 1998.
Great Britain Search Report, Application No. GB 9917501.0, dated Apr. 23, 2002.

*Primary Examiner*—Toan Ton
*Assistant Examiner*—Andrew Schechter
(74) *Attorney, Agent, or Firm*—Renner, Otto, Boisselle & Sklar, LLP

(57) ABSTRACT

To manufacture at a good yield a large-screen display having low resistivity of wires and excelling in flatness of substrates, a metal material, a transparent electrode material, and a conductive resin are used for forming either scanning electrodes or signal electrodes, or both of the same. Not less than two materials are used as the metal material, while amorphus ITO is used as the transparent electrode material. An electrode substrate has electrode structures in each of which a metal wire made of the foregoing metal material, a transparent electrode made of the foregoing transparent electrode material, and a conductive resin layer are laminated in this order on a transparent substrate. Conductivity is imparted to the conductive resin layers by conductive particles electrodeposited by the micell electrolytic method.

30 Claims, 16 Drawing Sheets

U.S. PATENT DOCUMENTS 5,705,302 A * 1/1998 Ohno et al. .................... 430/7
5,712,695 A * 1/1998 Tanaka et al. ................ 349/79
5,847,793 A * 12/1998 Itoh .......................... 349/110
5,969,780 A * 10/1999 Matsumoto et al. ........ 349/106
5,995,188 A * 11/1999 Shimizu et al. ............. 349/147
6,068,953 A * 5/2000 Matsumoto et al. ........... 430/7
6,111,623 A * 8/2000 Sato .......................... 349/106

* cited by examiner

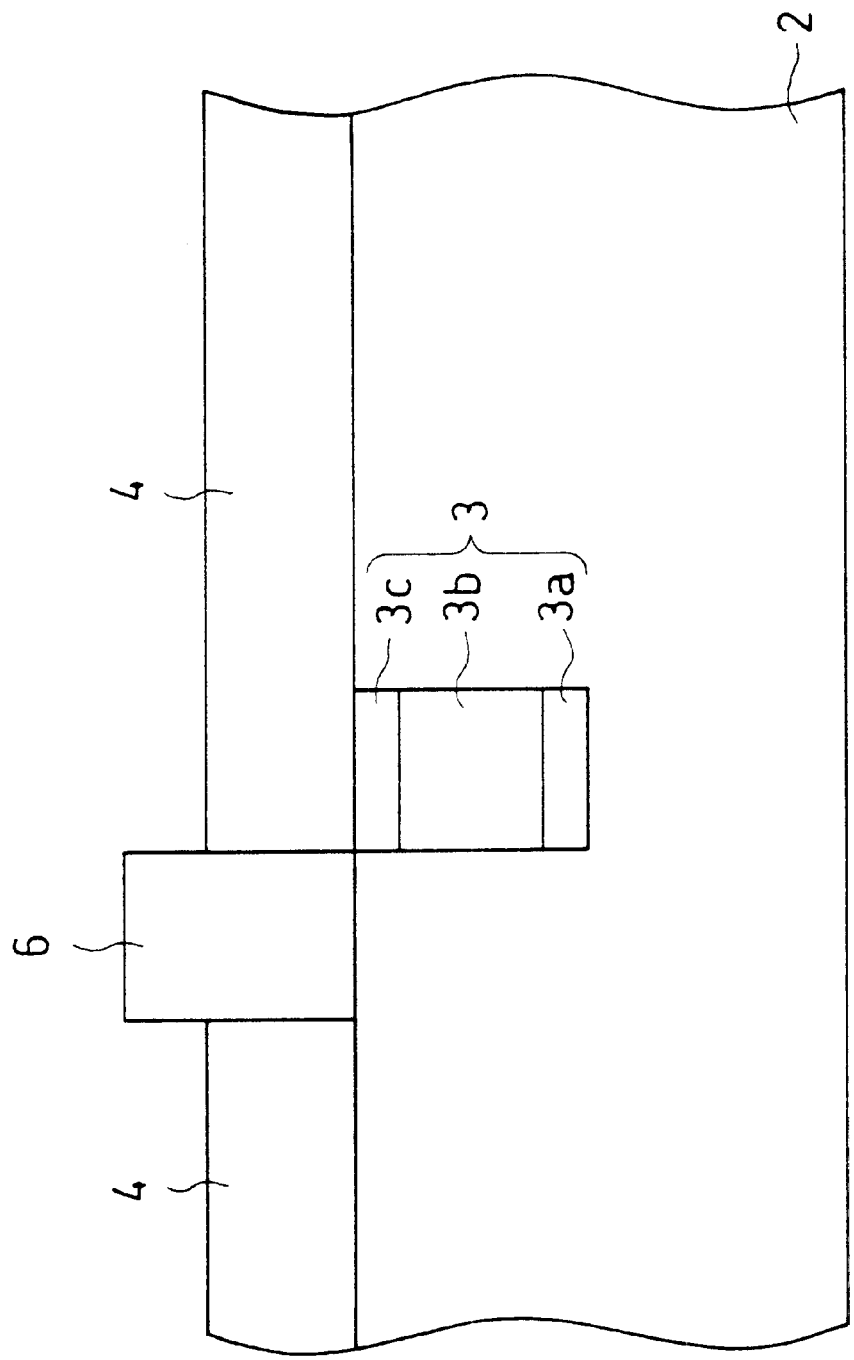

LCD DEVICE HAVING ELECTRODES COMPRISING CONDUCTIVE RESIN OR CONDUCTIVE COLOR FILTER AND MANUFACTURING METHOD OF THE SAME

FIELD OF THE INVENTION

The present invention relates to a liquid crystal display device and a manufacturing method of the same, and it particularly relates to a ferroelectric liquid crystal display device having a large screen and being capable of high-definition display, as well as relates to a manufacturing method of the same.

BACKGROUND OF THE INVENTION

Ferroelectric liquid crystal has excellent properties such as excellent memory effect, high-speed response, and a wide visual angle, and in the case where it is applied to a display device of a simple matrix type, the display device becomes capable of high-definition large-capacity display (see N. A. Clark and S. T. Lagerwall, Appl. Phys. Lett., 36 (1980), pp. 899 (Date of Publication: Jun. 1, 1980)). An example of a conventional structure of a ferroelectric liquid crystal display device is shown in FIG. 13 which is a cross-sectional view of the same.

The ferroelectric liquid crystal display device is provided with two glass substrates 112a and 112b. On the glass substrate 112a, a plurality of transparent signal electrodes 113a made of indium tin oxide (ITO) or the like are formed so as to be parallel with each other, on which a transparent insulating film 114a made of $SiO_2$ (silicon dioxide) or the like is formed.

On the glass substrate 112b facing the glass substrate 112a, transparent scanning electrodes 113b made of ITO or the like are formed so as to be parallel with each other in a direction crossing the direction of the signal electrodes 113 at a right angle, and the scanning electrodes 113b are also covered with a transparent insulating film 114b made of $SiO_2$.

On the transparent insulating films 114a and 114b, alignment films 115a and 115b having been subjected to a uniaxial alignment processing such as a rubbing operation are formed, respectively. As the alignment films 115a and 115b, an organic polymer film such as a polyimide film, a nylon film, or a polyvinyl alcohol film, a SiO (silicon monoxide) rhombic vapor deposition film, or the like is used. In the case where an organic polymer film is adapted so as to be used as the alignment films 115a and 115b, such alignment processing as to align the liquid crystal molecules so as to be substantially parallel with respect to the electrode substrates is applied to the alignment films 115a and 115b.

The glass substrate 112a on which the signal electrodes 113a, the transparent insulating film 114a, and the alignment film 115a are laminated in this order is hereinafter referred to as an electrode substrate 110. Likewise, the glass substrate 112b on which the scanning electrodes 113b, the transparent insulating film 114b, and the alignment film 115b are laminated in this order is hereinafter referred to as an electrode substrate 111.

The electrode substrates 110 and 111 are combined to each other with a sealing material 116 which is applied thereto except a part serving as an injection opening, through which subsequently ferroelectric liquid crystal 117 is injected into a space formed between the alignment films 115a and 115b. Then, the injection opening is sealed with the sealing material 130.

The electrode substrates 110 and 111 thus assembled are sandwitched between polarization plates 118a and 118b which are arranged so that polarization axes thereof cross each other at a right angle. In the case where a display area is large, spherical spacers 119 are dispersely provided between the electrode substrates 110 and 111 so that the electrode substrates 110 and 111 are parallel with each other, resulting in that a uniform cell thickness is achieved.

The ferroelectric liquid crystal molecules 120 have spontaneous polarization 121 in a direction orthogonal to a direction of a major axis of the molecule 120, as shown in FIG. 14. Therefore, each of the ferroelectric liquid crystal molecules 120 moves along a surface of a conical locus 122 in response to a force proportional to a vector product of the spontaneous polarization 121 and an electric field which is generated by a voltage applied across the signal electrode 113a and the scanning electrode 113b.

Therefore, to the eyes of an observer, the ferroelectric liquid crystal molecule 120 appears to switch between generator positions A and B in the conical locus 122, as shown in FIG. 15. Here, in the case where, for example, the polarization plates 118a and 118b are arranged so that a direction of the polarization axis of one of the polarization plates 118a and 118b agrees with the molecular major axis direction 138a of the molecule 120 at the position A and that a direction of the polarization axis of the other polarization plate agrees with a direction 138b, a dark field is obtained when the molecules 120 switch to the position A. A bright field is obtained due to birefringence when the molecules 120 switch to the position B.

Furthermore, respective alignment states of the ferroelectric liquid crystal molecules 120 in the positions A and B are equivalent in elastic energy. Accordingly, after the electric field by the voltage across the signal electrodes 113a and the scanning Helectrode 113b disappears, the alignment state, or the optical state, of the molecule 120 is maintained. This is a so-called memory effect of ferroelectric liquid crystal. The memory effect is a characteristic that the conventional nematic liquid crystal does not possess, and in combination with the high-speed response due to the spontaneous polarization, enables a display device using the ferroelectric liquid crystal to realize high-definition large-capacity display in a simple matrix arrangement.

On the other hand, the Japanese Publication for Laid-Open Patent Application No. 311213/1997 (Tokukaihei 9-311213, Date of Publication: Dec. 2, 1997) discloses the following manufacturing method: a micell colloid aqueous solution mainly consisting of transparent conductive particles, pigment particles, a surfactant, and a supporting electrolyte, in which the transparent conductive particles and the pigment particles are surrounded by the surfactant, is prepared by the wet electrolytic method, and the micell is broken by electrolysis so that the conductive particles and the pigment particles are separated and deposited on electrodes.

To realize moving picture display by means of a display device with a large screen, it is necessary to lower wire resistances of signal electrodes and scanning electrodes so as to reduce deformation of waveforms of applied voltages. In other words, for high-speed driving of a display device with a large screen, it is necessary to lower wire resistances so that waveforms of voltages applied to each pixel do not deform. A wire resistance required is determined by a capacitance of the display device and a pulse width of a driving waveform. More specifically, it is necessary to set the wire resistance low so as to fall in a predetermined range as shown in the Patent Application No. 361209/1997 (Tokuganhei 9-361209, corresponding to U.S. patent application Ser. No. 09/217,162) which the Applicant of the present invention has filed.

Therefore, metal wires are used as supplementary wires, but such an arrangement undergoes, apart from problems related to fine processing and adhesion to substrates, such problems as line defects, etch selectivity of metal or transparent electrodes (transparent conductive films), and flatness of a substrate.

Furthermore, there exist in transparent electrodes many projections which are caused by nodules of a target used in film formation and in turn cause disorder of alignment and vertical leakage (leakage between upper and lower transparent electrodes). The following description will explain these problems.

[Line Defects]

In the process of forming wires in a liquid crystal display device, dusts, defects in formed resist patterns, metal wiring defects, defects in formed transparent electrodes, etc. cause defects in wires. Such defects lead to display defects such as line defects and pixel defects after completion of a panel.

[Etching Selectivity of Metal or Transparent Electrodes]

The large display device manufacturing process includes, relating to the wiring for forming signal electrodes and scanning electrodes, a metal wire forming step and a transparent electrode forming step, through which metal wires and transparent electrodes are formed so as to be electrically connected. Here, sometimes acidic etching liquid used in a transparent electrode patterning step permeates to the metal wiring side, and for requirements of some designs or for other reasons, the metal wires are exposed to the etching liquid used for forming the transparent electrodes. To avoid corrosion of metal in the foregoing steps, it is necessary to select a metal material with resistance against the transparent electrode etching liquid.

[Flatness of Substrate]

The large display device manufacturing process includes the foregoing metal wire forming step and transparent electrode forming step, and further, relating to formation of color filters and the like, a step of forming resin which contains pigments. Since a surface of the substrate processed through the foregoing steps have raised and recessed portions caused through the foregoing steps, it is difficult to achieve flatness of the substrate. In the case of a liquid crystal display device, such roughness of the substrate surfaces leads to such problems as irregular liquid crystal alignment, irregular discharge, non-uniformity in distance between substrates, and non-uniformity in display. Therefore, it is necessary to decrease the steps which tend to make surfaces of the substrates rough, as well as to add steps for ensuring flatness of the substrates.

[Alignment Disorder and Vertical Leakage due to Projections on Transparent Electrodes]

In formation of the transparent electrodes by the sputtering method or the vapor deposition method, nodules 142 are formed on a target 141, as shown in FIG. 16(a). The nodules 142 grow in size after formation as the sputtering operation goes on, and past the elastic limit, they are broken into pieces as shown in FIG. 16(b), which become nuclei of new nodules 142. Upon the breakdown of the nodules 142, many segments 144 of the transparent electrode material adhere to an opposite substrate 143. In the case where a cell gap between the substrates 144 and 143 is small, such conductive segments 144 or projections tend to cause alignment disorder or vertical leakage upon application of an electric field, as shown in FIG. 16(c).

[Reduction of Photoprocess Steps]

A process for manufacturing a liquid crystal display using metal wires as supplementary wires generally requires three steps of photoprocessing. More specifically, a step of patterning a light blocking layer to form a black matrix, a transparent electrode patterning step, and a metal wire patterning step require photoprocessing, which means that photoprocessing has to be carried out three times with respect to one substrate. Since the other opposite substrate requires similar patterning steps, photoprocessing is required to be carried out six times in total. Furthermore, photoprocessing is also carried out to form spacers for control of the cell gap, resulting in that photoprocessing has to be carried out seven times in total.

SUMMARY OF THE INVENTION

The present invention was made in light of the aforementioned problems, and the object of the present invention is to provide a liquid crystal display device with a large display screen which has low resistance wiring and excels in flatness of substrates, and a method for manufacturing the same at a good yield.

To achieve the foregoing object, a liquid crystal display device of the present invention, which is a liquid crystal display device provided with a substrate on which scanning electrodes are laid and a substrate on which signal electrodes are laid, is arranged so that a metal material, a transparent electrode material, and a conductive resin are used for forming either the scanning electrodes or the signal electrodes, or both of the same.

With the foregoing arrangement, it is possible to lower resistance of the electrodes without impairing flatness of the substrate, and therefore, it is possible to provide a large-scale liquid crystal display device which does not undergo alignment disorder caused by roughness of the substrate, incomplete switching behaviors of liquid crystal due to the lowering of voltages, the lowering of contrast, defects in gray scale, etc. Furthermore, it undergoes neither display defects nor vertical leakage, and accordingly excels in display performance.

Furthermore, to achieve the foregoing object, a liquid crystal display device of the present invention, which is a liquid crystal display device provided with a substrate on which scanning electrodes are laid and a substrate on which signal electrodes are laid, is arranged so that a metal material, a transparent electrode material, and a conductive color filter are used for forming either the scanning electrodes or the signal electrodes, or both of the same.

With the foregoing arrangement, it is possible to lower resistance of the electrodes without impairing flatness of the substrate, and therefore, it is possible to provide a large-scale liquid crystal display device which does not undergo alignment disorder caused by roughness of the substrate, incomplete switching behaviors of liquid crystal due to the lowering of voltages, the lowering of contrast, defects in gray scale, etc. Furthermore, it undergoes neither display defects nor vertical leakage, and accordingly excels in display performance. Moreover, since the conductive color filter is used, an electrode structure serving as a color filter as well can be realized.

Furthermore, to achieve the foregoing object, a liquid crystal display device of the present invention, which includes a substrate on which scanning electrodes are laid, and a substrate on which signal electrodes are laid, is arranged so that (1) each of either the scanning electrodes or the signal electrodes, or both of the same, has an electrode structure composed of at least a transparent electrode and a conductive resin layer which are laminated in this order, and (2) an insulating layer serving as a light blocking layer and a spacer is provided on at least one of the substrates.

Furthermore, to achieve the foregoing object, a liquid crystal display device of the present invention, which includes a substrate on which scanning electrodes are laid, and a substrate on which signal electrodes are laid, is arranged so that (1) each of either the scanning electrodes or the signal electrodes, or both of the same, has an electrode structure composed of at least a transparent electrode and a conductive color filter layer which are laminated in this order, and (2) an insulating layer serving as a light blocking layer and a spacer is provided on at least one of the substrates.

According to any one of the foregoing arrangements, the insulating layer serves as a light blocking layer for preventing light exchange between the pixels, as well as serves as spacers for keeping the substrates at a uniform distance. Therefore, as compared with a case where the light blocking layer and the spaces are formed independently, photoprocessing operations are reduced in number, thereby resulting in the lowering of costs.

To achieve the foregoing object, a method for manufacturing a liquid crystal display device of the present invention includes the step of subjecting a surface of either the conductive resin layer or the conductive color filter layer to either pressing or polishing, or both of the same, so as to improve flatness of the surface.

By the foregoing method, the flatness of the substrate surface is further enhanced by pressing or polishing.

To achieve the foregoing object, a method for manufacturing a liquid crystal display device of the present invention includes the step of forming the conductive resin layer, the conductive color filter layer, or the second conductive resin layer by the micell electrolytic method.

By the foregoing method, conductive particles, or conductive particles plus pigment particles, are deposited on electrodes by the micell electrolytic method, resulting in that a desired conductive layer can be formed.

For a fuller understanding of the nature and advantages of the invention, reference should be made to the ensuing detailed description taken in conjunction with the accompanying drawings.

BRIEF DESCRIPTION OF THE DRAWINGS

FIG. 2 is a cross-sectional view schematically illustrating an arrangement of metal wires on the electrode substrate.

DESCRIPTION OF THE PREFERRED EMBODIMENTS

First Embodiment

The following description will explain an embodiment of the present invention while referring to FIGS. 1 through 6.

Figure 1:
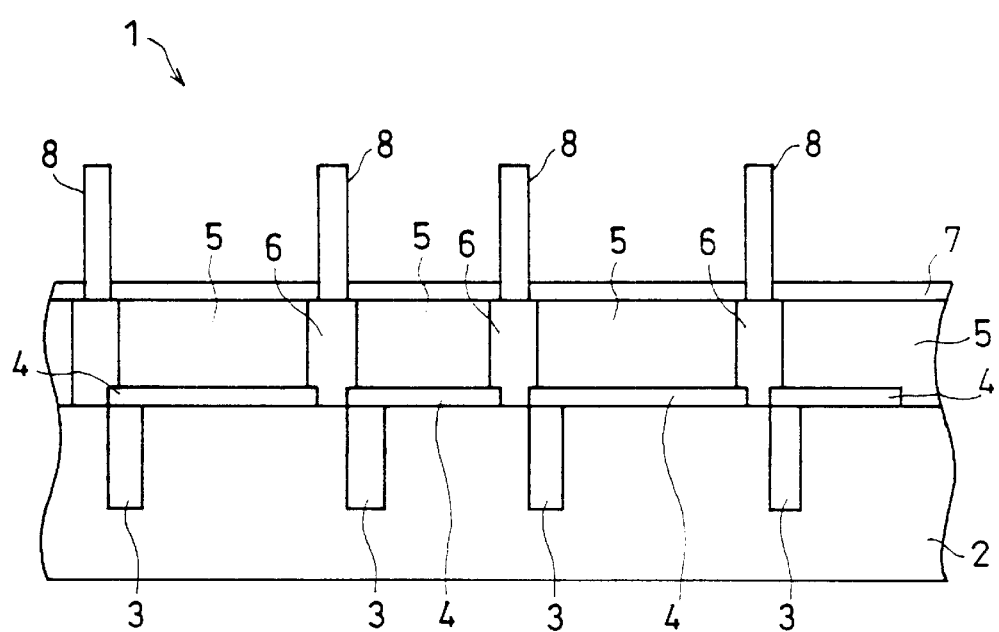
FIG. 1 is a cross-sectional view schematically illustrating electrode structures of an electrode substrate for use in a liquid crystal display device in accordance with an embodiment of the present invention.

FIG. 1 is a cross-sectional view schematically illustrating electrode structures of an electrode substrate 1 used in a ferroelectric liquid crystal display device in accordance with the present embodiment. This arrangement of the electrode structures is applied to both a signal line substrate and a scanning line substrate constituting a liquid crystal cell of the liquid crystal display device in accordance with the present embodiment, but this arrangement may be applied to one of the same alone.

The electrode substrate 1 is, as shown in FIG. 1, provided with a transparent substrate 2, metal wires 3 as metal electrodes, transparent electrodes 4, conductive resin layers 5, a light blocking layer 6, and a coat film 7. The transparent substrate 2 is made of glass, and the transparent electrodes 4 are made of amorphus ITO. The light blocking layer 6 is a resin layer called "black" for insulating electrodes from each other and sheltering each electrode. The coat film 7 refers to an insulating film and an alignment film provided over the electrode structures.

The metal wires 3 are laid in grooves preliminarily formed in the transparent substrate 2, and can be formed using a low-resistant metal material such as Cu or Al, or an alloy of the same as a main material. Each metal wire 3 is composed of a first metal layer 3a, a second metal layer 3b, and a third metal layer 3c. The first, second, and third metal layers 3a, 3b, and 3c are made of Ta, Cu, and Ta, respectively. The arrangement is, however, not limited to this. For example, Cr, Ti, Ni, or the like may be adapted, instead of Ta, so as to form the first metal layer 3a, and Al or the like may be adapted, instead of Cu, so as to form the second metal layer 3b. In the case where the first and third metal layers 3a and 3c are formed to a thickness of 100 nm each with Ta, Cr. or the like and the second metal layer 3b is formed to a thickness of 1000 nm with Cu, the resistivity of the wire resistance becomes 2 $\mu\Omega$cm, which means realization of low-resistant wiring with a resistivity of about 1/1000 of the transparent electrode 4.

The conductive resin layers 5 are formed with conductive particles made to adhere to the transparent electrodes 4, by a method which will be described below, and the conductivity is imparted to the conductive resin layer 5 by the conductive particles.

The electrode substrate 1 is thus arranged so that each wire serving as a scanning electrode or a signal electrode (both the scanning electrode and the signal electrode serve as display electrodes) has a multilayer structure, composed of the metal wire 3, the transparent electrode 4, and the conductive resin layer 5, thereby being not prone to line defects such as the breaking of wires. According to an actual survey on the ratio of the breaking of wires, the ratio was 0.1% in the case of electrode structures composed of conventional metal wires and transparent electrodes, whereas it was as low as 0.03% in the case of the trilaminar electrode structures in accordance with the present embodiment. Therefore, with the arrangement of the present embodiment, it is possible that a liquid crystal display device with 30,000 lines undergoes no breaking of wires.

Furthermore, the electrode substrate 1 is arranged so that erosion of the metal wires 3 during the etching for forming the transparent electrodes 4 in the manufacturing process is prevented. More specifically, the metal wires 3 have a trilaminar structure each as described above, and any one of Ta, Cr, Ti, and Ni which are resistant to erosion by an acidic etching liquid such as a nitric acid solution or a hydrobromic acid solution is adapted so as to form the first metal layer 3a and the third metal layer 3c. Such a metal prevents Cu or Al forming the second metal layer 3b from being eroded during the etching for forming the transparent electrode. Further, the transparent electrode 4 is formed with amorphus ITO or the like. In the case of amorphus ITO, the etching speed is about ten times that in the case of polycrystal, and accordingly the etching is possible with an etching liquid with weak acidity while erosion of metal further hardly occurs. Incidentally, the second metal layer 3b is not necessarily provided between the first metal layer 3a and the third metal layer 3c, and if necessary the arrangement may be such that only the third metal layer 3c, from among the first and third metal layers 3a and 3c, is provided so as to cover the second metal layer 3b. This arrangement also enables prevention of erosion of the second metal layer 3b during the etching operation for forming the transparent electrodes.

Furthermore, since the electrode substrate 1 has a structure in which the conductive resin layers 5 are provided on the transparent electrodes 4, projections of the transparent electrodes 4 do not affect the flatness of the substrate, resulting in improvement of the flatness.

Figure 16A:
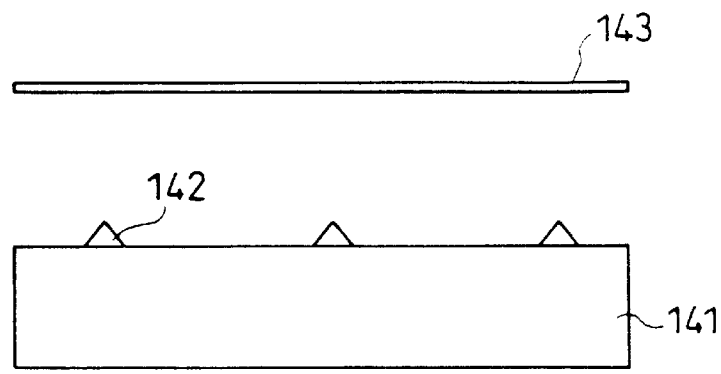
FIGS. 16(a) through 16(c) are views explaining how projections on ITO as a transparent electrode material are formed in a step of forming transparent electrodes.
Figure 16B:
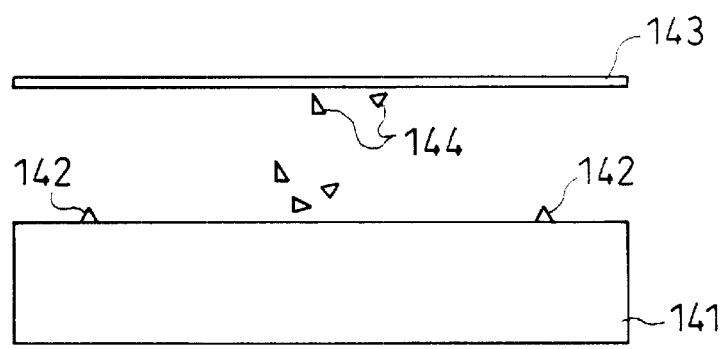
Figure 16C:
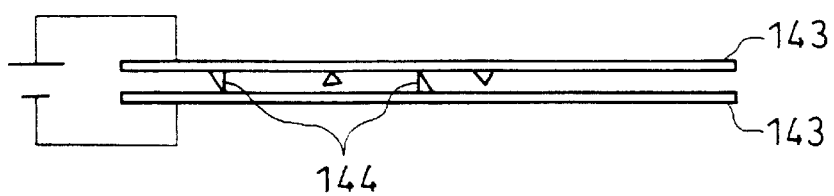

As described above, nodules 142 are formed on a target 141 when the transparent electrodes are formed by the sputtering method or the vapor deposition method, as shown in FIG. 16(a). Such nodules 142 cause conductive projections of usually about 1 $\mu$m in diameter and height to be formed on the transparent electrodes. Then, due to the conductive projections, alignment disorder and vertical leakage tend to occur upon application of an electric field, in the case of a cell with a cell gap of about 1 $\mu$m, such as a ferroelectric liquid crystal display device.

In the case of the electrode substrate 1 of the present embodiment wherein the conductive resin layers 5 are formed on the transparent electrodes 4 by the later described method, such conductive projections are buried in the conductive resin layers 5 and a flat surface is formed, resulting in that such alignment disorder and vertical leakage are avoided. Actually, according to the present embodiment, level differences on the substrate surface including the metal wires 3 were as small as about 0.1 $\mu$m, and consequently liquid crystal excelled in alignment.

The following description will explain a method of forming the electrode substrate 1 while referring to FIGS. 3(a) through 6.

Figure 3A:
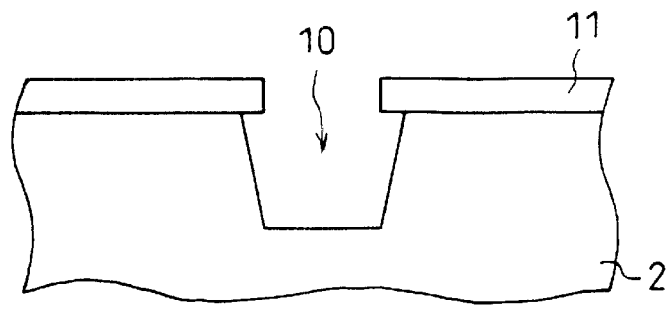
FIGS. 3(a) through 3(d) are cross-sectional views illustrating steps of forming the metal wires.

First of all, a 300×400 transparent substrate 2 made of glass is washed with pure water, and grooves 10 of 1.2 $\mu$m in depth and 15 $\mu$m in width are formed on the substrate 2 by the photoprocessing technique, as shown in FIG. 3(a). TSMR-8800 available from Tokyo Ohka Kogyo Co., Ltd., for example, can be used as a photoresist 11 for use in the foregoing photoprocessing technique. More specifically, the photoresist 11 was formed to a thickness of 2 $\mu$m by spin coating, and thereafter, it was subjected to annealing at 120° C. To etch the glass, 15% buffered hydrofluoric acid was used, and the etching operation was carried out 12 minutes to a depth of 1.2 $\mu$m.

Figure 3B:
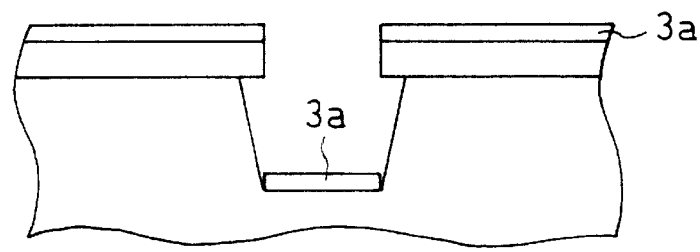
Figure 3C:
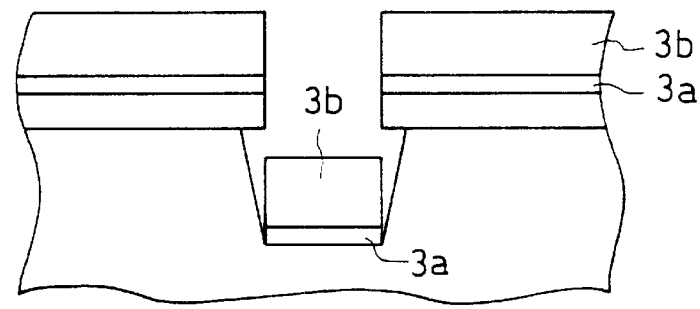
Figure 3D:
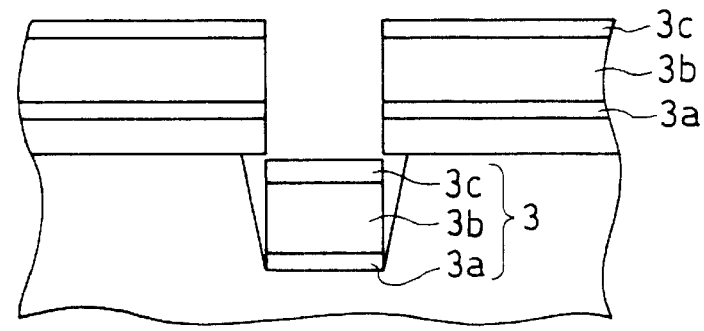

Next, leaving the foregoing photoresist 11, the first metal layer 3a, the second metal layer 3b, and the third metal layer 3c were formed in this order to a thickness of 0.1 $\mu$m, 1 $\mu$m, and 0.1 $\mu$m, respectively, by the sputtering method or the vapor deposition method, as shown in FIGS. 3(b) through 3(d). Thereafter, the substrate 2 was soaked in acetone solution, and metal wires 3 were formed by the lift-off method. As described hereinbefore, the first, second, and third metal layers 3a, 3b, and 3c were formed with Ta, Cu, and Ta, respectively. As a result, the metal wires 3 with a resistivity of 2 $\mu\Omega$cm were obtained.

Subsequently, to form the transparent electrodes 4, either amorphus ITO or ITO containing 20% of zinc dioxide ($ZnO_2$) was deposited to a thickness of 0.2 $\mu$m by means of a sputtering device, and patterning was carried out to a length of 280 mm at a pitch of 120 $\mu$m, using the same photoresist as the foregoing photoresist 11. For the etching to form the transparent electrodes 4, 3% aqua regia or hydrobromic acid solution was used and an etching period was set to 5 minutes.

After forming the transparent electrodes 4, photosensitive resin (V-259BK, available from the Nippon Steel Chemical Co., Ltd.) was formed into a film, which was subjected to patterning at a width of 25 $\mu$m, and thereafter to annealing at 200° C., whereby the light blocking layer 6 was formed to a height of 0.5 $\mu$m.

Subsequently, conductive resin layers 5 were formed on the transparent electrodes 4 by the micell electrolytic method. In the micell electrolytic method, 5 litter of a conductive particle colloid aqueous solution for electrodeposition was prepared using 100 g of ITO with a particle diameter of 0.2 $\mu$m as conductive particles, 15 g of ferrocene PEG as a surfactant, and 50 g of a supporting electrolyte composed of LiBr, and the solution was put in an electrolysis vessel 20 shown in FIG. 4(a). As shown in the figure, in the solution, the conductive particles 21 were surrounded by the surfactant 22. The foregoing substrate 2 with the metal wires 3, the transparent electrodes 4, and the like formed thereon was placed in the electrolysis vessel 20, so that conductive particles 21 were electrodeposited on the transparent electrodes 4 on the substrate 2. For electric connection of the substrate 2 with an external power source 23, an electrodeposition-use electrode 24 was formed with silver paste (STR-9470, available from Chemitoron Co., Ltd.). As a counter electrode 25, an electrode made of stainless steel was used. A voltage of 1 V was applied from the external power source 23 for 5 minutes to break the micell so that the conductive particles 21 were deposited on the transparent electrodes 4. As a result, the conductive particles 21 were deposited to a thickness of about 0.5 µm on the transparent electrodes 4.

By the foregoing electrodeposition method, even if projections 26 (see FIG. 6) are formed on the transparent electrodes 4, a flat surface can be obtained since a ratio of the conductive particles 21 adhering to the projections 26 is low.

Figure 5:
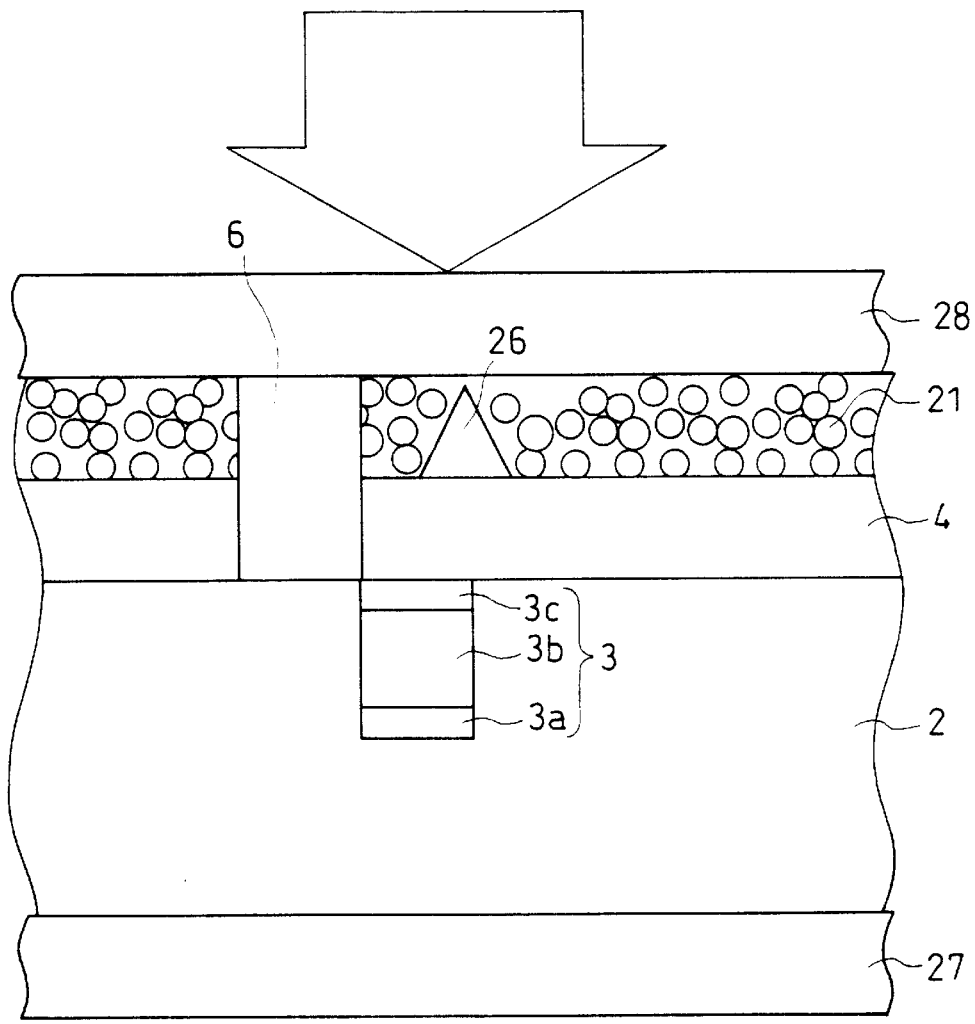
FIG. 5 is an explanatory view illustrating a pressing step following to the electrodeposition of the conductive particles on the electrodes.

Furthermore, after the substrate 2 was subjected to preliminary annealing at 120° C., then to improve the flatness of the substrate 2, the surface of the substrate 2 held on a platen 27 was subjected to pressing with a pressure of 1 kg/cm$^2$, with another substrate 28 with a flat surface inserted therebetween, as shown in FIG. 5. As a result, the conductive particles 21 on the surface of the substrate 2 were re-arranged, whereby the level difference was reduced to 0.05 µm. Thus, affect of the projections 26 of the transparent electrodes 4 was completely eliminated. Since gaps exist between the conductive particles 21 after the preliminary annealing, the conductive particles 21 can be densified by pressing.

Here, in the case where the conductive particles 21 are deposited to a thickness of not less than 0.05 µm, level differences in the layer composed of the conductive particles 21 become not more than 0.05 µm, thereby causing affect of the projections 26 of the transparent electrodes 4 to be reduced. On the other hand, it was found that a quantity of transmitted light is reduced to 60 percent in the case where the conductive particles are electrodeposited to a thickness exceeding 5 µm, and that therefore lamination to a thickness exceeding 5 µm is inappropriate.

Figure 6:
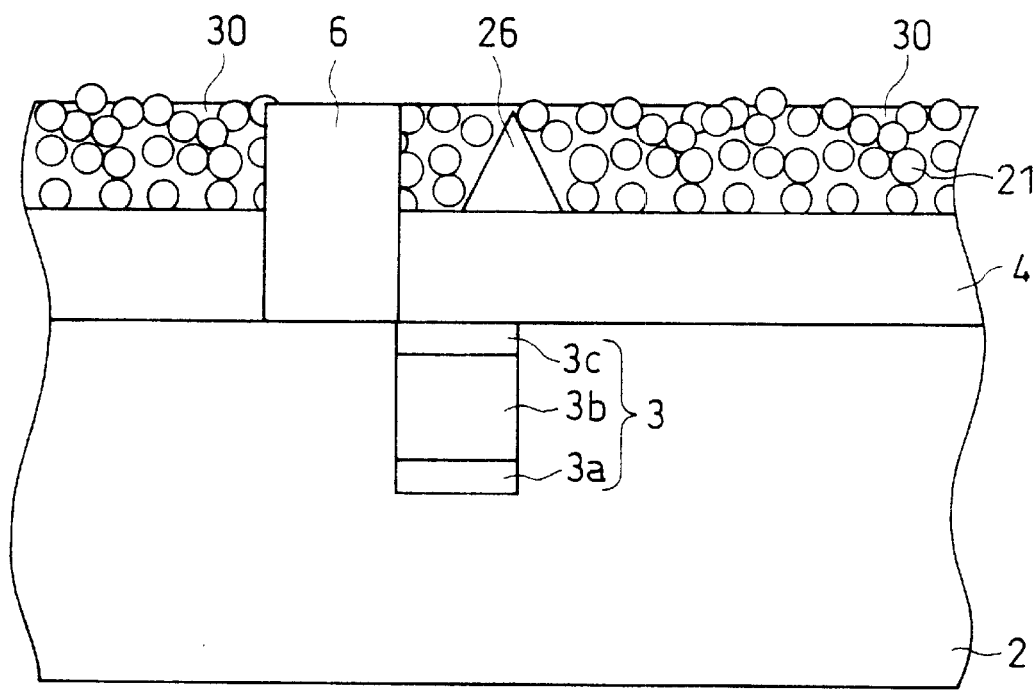
FIG. 6 is a cross-sectional view illustrating a state in which resin is applied and annealed after the pressing step.

Thus, after the conductive particles 21 were electrodeposited on the transparent electrodes 4 and were subjected to pressing, then in order to fix the conductive particles 21, resin 30 was applied thereon to a thickness of about 200 nm as shown in FIG. 6, and was subjected to annealing at 200° C. for thermal hardening so as to become hardened. Overcoat-use resin (trade name: HP-1009-IM6) available from Hitachi Chemical Co., Ltd. may be used as the resin 30. The resin 30, containing the conductive particles 21, became conductive, whereby conductive resin layers 5 were formed.

Thereafter, the surface of the substrate 2 was polished by means of a polishing tape, and the level difference of the substrate 2 was reduced to 0.045 µm. Incidentally, as the foregoing polishing tape, a polishing tape available from Japan Microcoating Co., Ltd. (trade name: YWA-10000-75-FFZ) can be used.

Subsequently, after 1.5 µm-high spacers 8 were formed, a silicon dioxide (SiO$_2$) insulating film with a thickness of 20 nm and a polyimide alignment film with a thickness of 20 nm were formed thereon in this order, and a uniaxial alignment processing by rubbing was applied to the alignment film, whereby the coating film 7 was completed. Incidentally, the formation of the spacers and the films does not have to be in this order, and, for example, the spacers 8 may be formed after the alignment film is completed.

The thus formed electrode substrate 1 and another substrate produced in the same manner were combined facing each other in a manner such that the spacers 8 came therebetween, and ferroelectric liquid crystal was injected into therebetween, whereby a display device was completed. The resultant ferroelectric liquid crystal display device underwent neither line defects nor vertical leakage, and excelled in display performance.

Second Embodiment

Figure 4A:
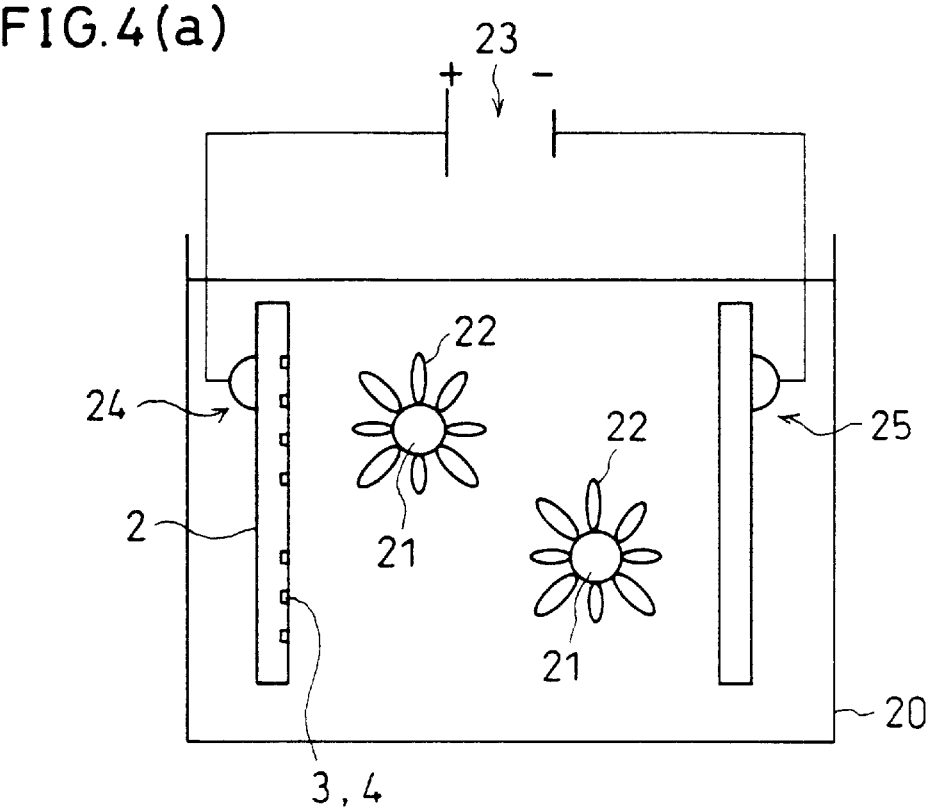
FIGS. 4(a) and 4(b) are explanatory views illustrating steps of forming conductive layers by electrodepositing conductive particles on electrodes by the micell electrolytic method.
Figure 4B:
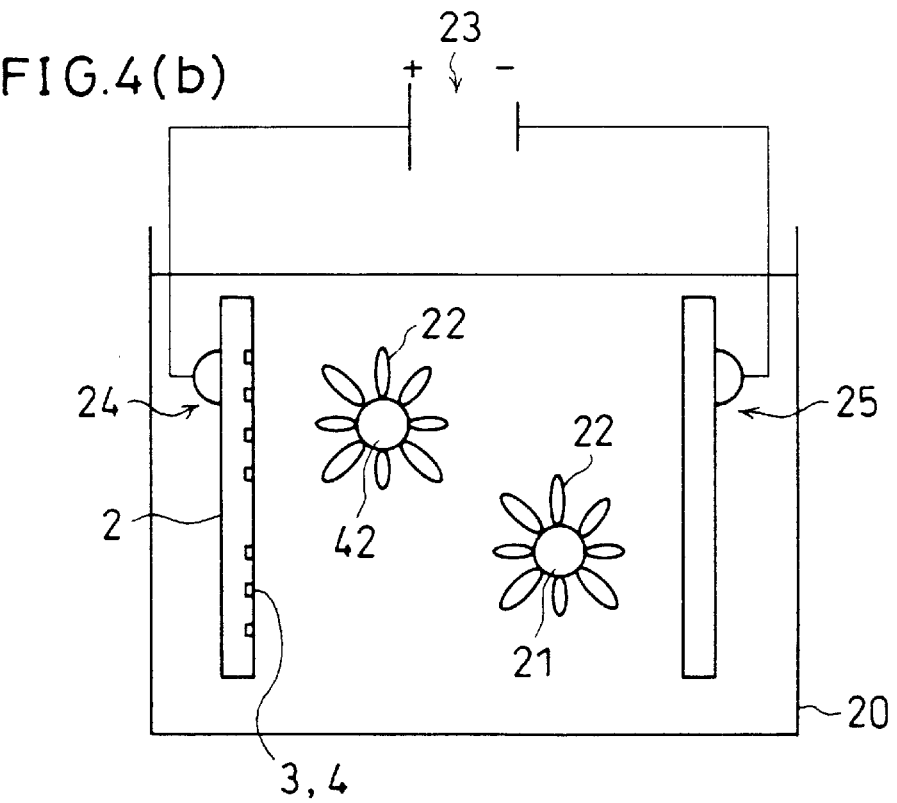

The following description will explain another embodiment of the present invention while referring to FIGS. 4(*b*) and 7. Incidentally, the members having the same structure (function) as those shown in the figures in conjunction with the first embodiment will be designated by the same reference numerals and their description will be omitted.

Figure 7:
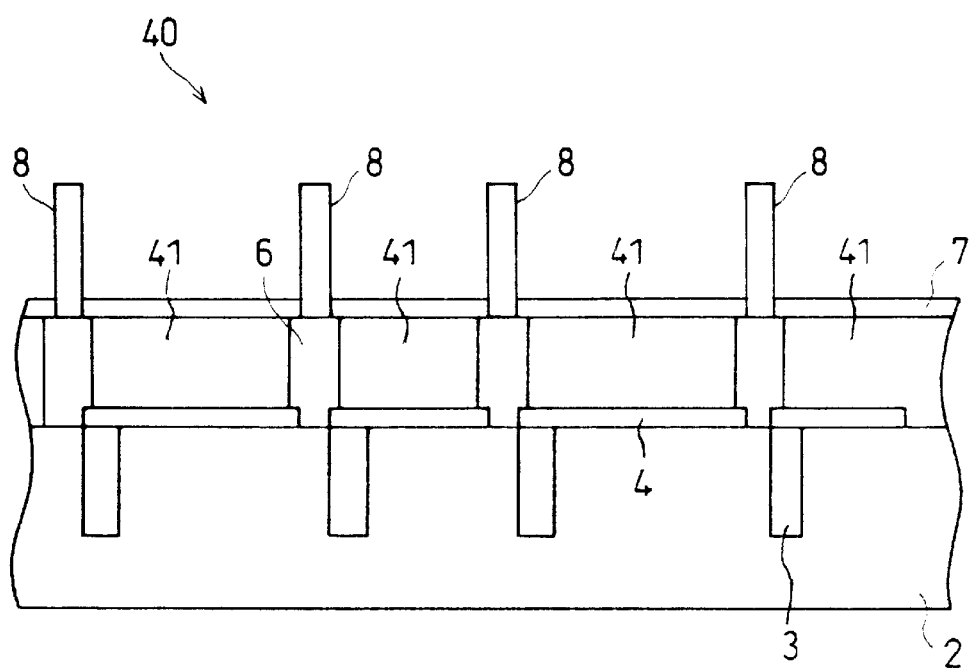
FIG. 7 is a cross-sectional view schematically illustrating electrode structures of an electrode substrate for use in a liquid crystal display device in accordance with another embodiment of the present invention.

An electrode substrate 40 of the present embodiment has the same arrangement as that of the electrode substrate 1 of the first embodiment, except that the electrode substrate 40 includes conductive color filter layers 41, in the place of the conductive resin layers 5 of the first embodiment, as shown in FIG. 7. The conductive color filter layers 41 are composed of three types of conductive color filter layers 41 corresponding to red, green and blue, and they are formed in a predetermined arrangement pattern.

Next, the method for forming the foregoing electrode substrate 40 will be described, with focus put on the process of forming the conductive color filter layers 41.

The method for forming the metal wires 3, the transparent electrodes 4, and the light blocking layer 6 on the transparent substrate 2 is the same as that in the first embodiment.

In the present embodiment, after formation of the light blocking layer 6, the conductive color filter layers 41 were formed on the transparent electrodes 4 by the micell electrolytic method. In the micell electrolytic method, as shown in FIG. 4(*b*), an electrodeposition-use colloid aqueous solution was prepared, with pigment particles 42 additionally along with the foregoing conductive particles 21. In the solution, the conductive particles 21 and the pigment particles 42 were surrounded by the surfactant 22. Red pigment particles (40 g of dianthraquinonyl red, 8 g of disazo yellow), green pigment particles (30 g of phthalocyanine green), blue pigment particles (25 g of phthalocyanine blue, 5 g of dioxane violet) were used as the pigment particles 42, and one electrolysis vessel 20 was prepared for each color.

The substrate 2 with the metal wires 3 and the transparent electrodes 4 provided thereon was placed in the electrolysis vessel 20, so that the conductive particles 21 and the pigment particles 42 were electrodeposited on the transparent electrodes 4 on the substrate 2. For electric connection of the substrate 2 with an external power source 23, an electrodeposition-use electrode 24 was formed with silver paste (STR-9470, available from Chemitoron Co., Ltd.). As a counter electrode 25, an electrode made of stainless steel was used. A voltage of 1 V was applied from the external power source 23 for 5 minutes to break the micell so that the conductive particles 21 and the pigment particles 42 were deposited on the transparent electrodes 4. As a result, the conductive particles 21 and the pigment particles 42 in respective colors were deposited to a thickness of about 0.5 µm on the transparent electrodes 4.

By the foregoing electrodeposition method, even if projections 26 (see FIG. 6) are formed on the transparent electrodes 4, a flat surface can be obtained since the pigment particles 42 and the conductive particles 21 fill spaces around the projections 26 and a ratio of the conductive particles 21 and the pigment particles 42 adhering to the projections 26 is low.

Furthermore, after the substrate 2 was subjected to preliminary annealing at 120° C., then, to improve the flatness of the substrate 2, the surface of the substrate 2 held on a platen 27 was subjected to pressing with a pressure of 1 kg/cm$^2$, with another substrate 28 with a flat surface inserted therebetween (see FIG. 5). As a result, the conductive particles 21 and the pigment particles 42 on the surface of the substrate 2 were re-arranged, whereby the level difference was reduced to 0.05 μm. Thus, affect of the projections 26 of the transparent electrodes 4 was completely eliminated.

Here, in the case where the conductive particles 21 and pigment particles 42 are deposited to a thickness of not less than 0.05 μm, level differences in the layer composed of the conductive particles 21 and pigment particles 42 become not more than 0.05 μm, thereby causing affect of the projections 26 of the transparent electrodes 4 to be reduced. On the other hand, it was found that a quantity of transmitted light is reduced to 60% in the case where the particles are electrodeposited to a thickness exceeding 5 μm, and that therefore lamination to a thickness exceeding 5 μm is inappropriate.

Thus, after the conductive particles 21 and the pigment particles 42 were electrodeposited on the transparent electrodes 4 and were subjected to pressing, then, in order to fix the conductive particles 21 and the pigment particles 42, resin 30 was applied thereon to a thickness of about 200 nm, and was subjected to annealing at 200° C. for thermal hardening so as to become hardened (see FIG. 6). Overcoat-use resin (trade name: HP-1009-IM6) available from Hitachi Chemical Co., Ltd. may be used as the resin 30. The resin 30, thus coming to contain the conductive particles 21 and the pigment particles 42, became conductive, whereby conductive color filter layers 41 serving as color filters also were formed.

Thereafter, the surface of the substrate 2 was polished by means of a polishing tape, and the level difference of the substrate 2 was reduced to 0.045 μm. Incidentally, as the foregoing polishing tape, a polishing tape available from Japan Microcoating Co., Ltd. (trade name: YWA-10000-75-FFZ) can be used.

Subsequently, after 1.5 μm-high spacers 8 were formed, a silicon dioxide ($SiO_2$) insulating film with a thickness of 20 nm and a polyimide alignment film with a thickness of 20 nm were formed thereon in this order, and a uniaxial alignment processing by rubbing was applied to the alignment film, whereby the coating film 7 was completed. Incidentally, the formation of the spacers and the films does not have to be in this order, and, for example, the spacers 8 may be formed after the alignment film is completed.

The thus formed electrode substrate 40 and another substrate produced in the same manner were combined facing each other in a manner such that the spacers 8 came therebetween, and ferroelectric liquid crystal was injected into therebetween, whereby a display device was completed. The resultant ferroelectric liquid crystal display device underwent neither line defects nor vertical leakage, and excelled in display performance.

Third Embodiment

Figure 8:
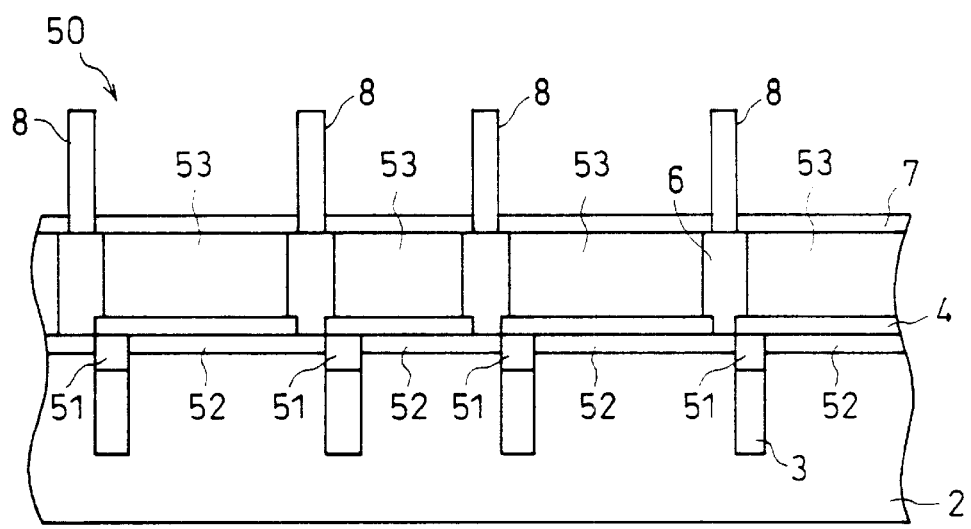
FIG. 8 is a cross-sectional view schematically illustrating electrode structures of an electrode substrate for use in a liquid crystal display device in accordance with still another embodiment of the present invention.
Figure 9:
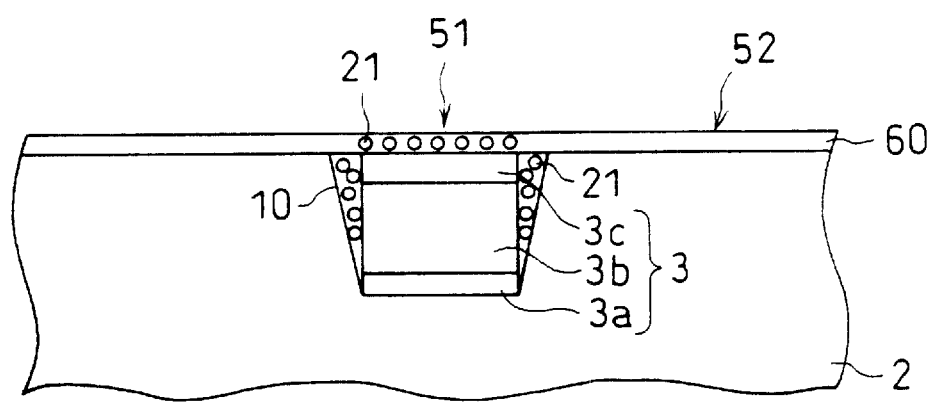
FIG. 9 is a cross-sectional view illustrating a state in which, in a step of forming the electrode substrate shown in FIG. 8, conductive particles are electrodeposited on metal wires and in spaces between the metal wires and grooves, and thereafter resin is applied thereon and annealed.

The following description will explain still another embodiment of the present invention, while referring to FIGS. 8 and 9. Incidentally, the members having the same structure (function) as those shown in the figures in conjunction with the first and second embodiments will be designated by the same reference numerals and their description will be omitted.

An electrode substrate 50 of the present embodiment differs from the electrode substrates 1 and 40 of the first and second embodiments in that the electrode substrate 50 includes second conductive resin layers 51 between the metal wires 3 and the transparent electrodes 4, and that the same includes transparent resin layers (insulating resin layers) 52 under the transparent electrodes 4, as shown in FIG. 8. Incidentally, conductive layers 53 formed on the transparent electrodes 4 may be the conductive resin layers 5 of the first embodiment, or may be the second conductive color filter layers 41 of the second embodiment.

The electrode substrate 50 is arranged so that each of the wires serving as scanning electrodes or signal electrodes has a multilayer structure, composed of the metal wire 3, the conductive resin layer 51, the transparent electrode 4, and the conductive layer 53 as described above, thereby being not prone to line defects such as the breaking of wires. According to an actual survey on the ratio of the breaking of wires, the ratio was 0.1% in the case of an electrode structure composed of conventional metal wires and transparent electrodes, whereas it was as low as 0.03% in the case of the electrode structure in accordance with the present embodiment. Therefore, with the arrangement of the present embodiment, it is possible that a liquid crystal display device with 30,000 lines undergoes no breaking of wires.

Furthermore, the electrode substrate 50 is arranged so as to have electrode structures each of which the metal wire 3 and the transparent electrode 4 are electrically connected through the conductive resin layer 51, whereby erosion of the metal wires 3 is further more sufficiently prevented as compared with the case of the electrode substrate 1 of the first embodiment. The conductive resin layers 51 are formed by electrodepositing conductive particles on the metal wires 3 and applying resin thereon by a method which will be described later. Here, the conductive particles also fill gaps between the metal wires 3 and the grooves 10. As a result, the flatness of the layers below the transparent electrodes 4 is further improved.

The following description will explain a method for producing the foregoing electrode substrate 50.

First, by the same method of the first embodiment as shown in FIGS. 3(a) through 3(d), the grooves 10 were formed on the transparent substrate 2, and metal wires 3 each composed of three layers were formed in each groove 10. As a result, the metal wires 3 with a resistivity of 2 μΩcm were obtained.

Next, the conductive resin layers 51 were formed on the metal wires 3 by the micell electrolytic method as shown in FIG. 4(a). In the micell electrolytic method, 5 litter of a conductive particle colloid aqueous solution for electrodeposition was prepared using 100 g of Ta with a particle diameter of 0.1 μm as conductive particles, 15 g of ferrocene PEG as a surfactant, and 50 g of a supporting electrolyte composed of LiBr, and the solution was put in an electrolysis vessel 20 shown in FIG. 4(a). As shown in the figure, in the solution, the conductive particles 21 were surrounded by the surfactant 22. The foregoing substrate 2 with the metal wires 3 formed thereon was placed in the electrolysis vessel 20, so that conductive particles 21 were electrodeposited on the metal wires 3 on the substrate 2. For electric connection of the substrate 2 with an external power source 23, an electrodeposition-use electrode 24 was formed with silver paste (STR-9470, available from Chemitoron Co., Ltd.). As a counter electrode 25, an electrode made of stainless steel was used.

A voltage of 1 V was applied from the external power source 23 for 2 minutes to break the micell so that the conductive particles 21 were deposited on the metal wires 3, as shown in FIG. 9. As a result, the conductive particles 21 were deposited to a thickness of about 0.2 $\mu$m on the metal wires 3. During electrodeposition, an electric field has a greater intensity in spaces between the metal wires 3 and the grooves 10, thereby causing the conductive particles 21 to fill the spaces as well. As a result, flatness of interfaces between the metal wires 3 and the transparent electrodes 4 can be improved.

Thus, after electrodeposition of the conductive particles 21 on the metal wires 3, then, in order to fix the conductive particles 21, resin 60 was applied thereon to a thickness of about 100 nm as shown in FIG. 9, and was subjected to annealing at 200° C. for thermal hardening so as to become hardened. Overcoat-use resin (trade name: HP-1009-IM6) available from Hitachi Chemical Co., Ltd. may be used as the resin 60. Parts of the resin 60 which came to contain the conductive particles 21 became conductive, whereas parts of the resin 60 which did not come to contain the conductive particles 21 came to have an insulating property, whereby the conductive resin layers 51 and the transparent resin layers 52 were completed.

Furthermore, since the resin 60 is not eroded by the etching liquid for forming the transparent electrodes 4, erosion of the metal electrodes 3 can be prevented.

Incidentally, Ta was used as conductive particles 21 in the present embodiment, but the present invention is not limited to this arrangement, and actually similar effects could be achieved in the case where any one of ITO, Mo, Cr was used as the conductive particles 21. Furthermore, the film thickness of the conductive resin layers 51 was determined so as to fall in a range of 0.05 $\mu$m to 5 $\mu$m, depending on a depth of the grooves 10 (1.2 $\mu$m to 5 $\mu$m) and a gap between the transparent substrate 2 and the metal wires 3.

After formation of the conductive resin layers 51 and the transparent resin layers 52, then to form the transparent electrodes 4, either amorphus ITO or ITO containing 20% of $ZnO_2$ was deposited to a thickness of 0.2 $\mu$m by means of a sputtering device, and patterning was carried out to a length of 280 mm at a pitch of 120 $\mu$m, using the same photoresist as the foregoing photoresist 11. For the etching to form the transparent electrodes 4, 3% aqua regia or hydrobromic acid solution was used and an etching period was set to 5 minutes.

After forming the transparent electrodes 4, photosensitive resin (V-259BK, available from the Nippon Steel Chemical Co., Ltd.) was deposited thereon into a film, which was subjected to patterning at a width of 25 $\mu$m, and thereafter to annealing at 200° C., whereby a light blocking layer 6 was formed to a height of 0.5 $\mu$m.

Subsequently, conductive layers 53 were formed on the transparent electrodes 4. In the case where the conductive resin layers 5 of the first embodiment are to be formed as conductive layers 53, the micell electrolytic method which is explained in the description of the first embodiment is used for forming the conductive resin layers 5. In the case where the conductive color filter layers 41 of the second embodiment are to be formed as conductive layers 53, the micell electrolytic method which is explained in the description of the second embodiment is used for forming the conductive color filter layers 41. The conductive resin layers 5 or the conductive color filter layers 41 can be completed, after electrodeposition of the conductive particles 21 (or the conductive particles 21 plus the pigment particles 42) on the transparent electrodes 4 by the micell electrolytic method, through the pressing step, the predetermined resin applying and thermal hardening step, the surface polishing step, and the like, like in the first and second embodiments.

Through the foregoing process, the electrode structures each composed of the metal wire 3, the conductive resin layer 51, the transparent electrode 4, and the conductive layer 53 were formed. Also laminar structures each composed of the transparent resin layer 52, the transparent electrode 4, and the conductive layer 53 were formed.

Subsequently, after 1.5 $\mu$m-high spacers 8 were formed, a silicon dioxide ($SiO_2$) insulating film with a thickness of 20 nm and a polyimide alignment film with a thickness of 20 nm were formed thereon in this order, and a uniaxial alignment processing by rubbing was applied to the alignment film, whereby the coating film 7 was completed. Incidentally, the formation of the spacers and the films does not have to be in this order, and, for example, the spacers 8 may be formed after the alignment film is formed.

The thus formed electrode substrate 50 and another substrate produced in the same manner were combined facing each other in a manner such that the spacers 8 came therebetween, and ferroelectric liquid crystal was injected into therebetween, whereby a display device was completed. The resultant ferroelectric liquid crystal display device underwent neither line defects nor vertical leakage, and excelled in display performance.

Fourth Embodiment

Figure 10:
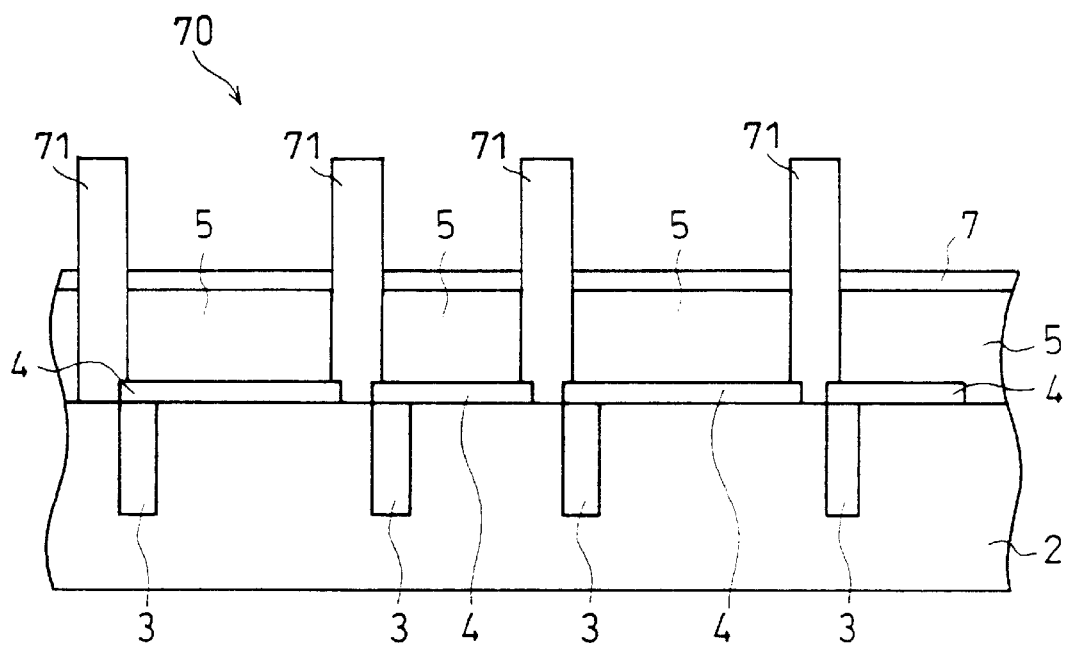
FIG. 10 is a cross-sectional view schematically illustrating electrode structures of an electrode substrate for use in a liquid crystal display device in accordance with still another embodiment of the present invention.
Figure 11:
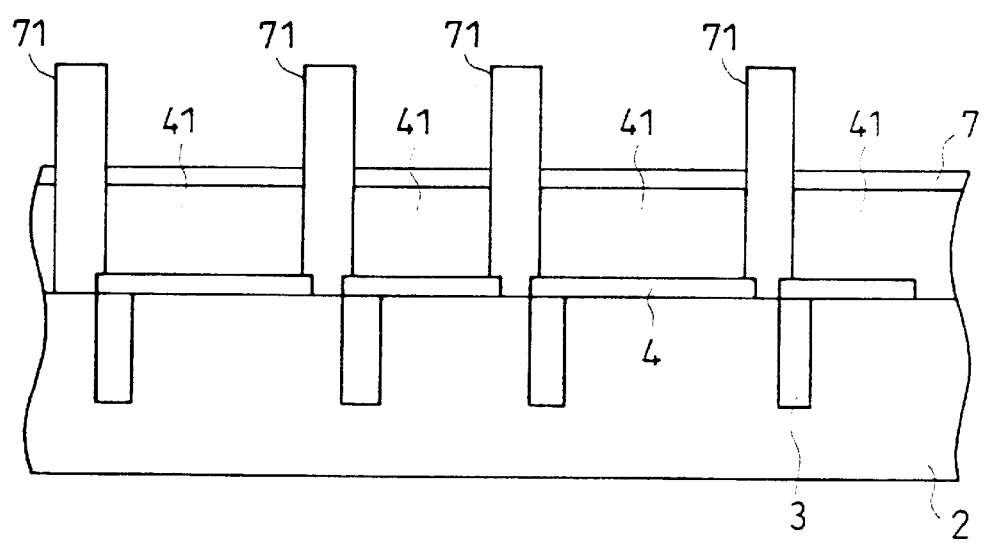
FIG. 11 is a cross-sectional view schematically illustrating electrode structures of an electrode substrate for use in a liquid crystal display device in accordance with still another embodiment of the present invention.

The following description will explain still another embodiment while referring to FIGS. 10 and 11. Incidentally, the members having the same structure (function) as those shown in the figures in conjunction with the above-mentioned embodiment will be designated by the same reference numerals and their description will be omitted.

An electrode substrate 70 of the present embodiment differs from the electrode substrate 1 of the first embodiment in that the electrode substrate 70 includes an insulating layer 71 serving as a light blocking layer and spacers, in the place of the light blocking layer 6 and the spacers 8 of the first embodiment. In other words, in the present embodiment, the insulating layer 71 serves as a light blocking layer called "black" for preventing light exchange between the transparent electrodes 4, as well as serves as the spacers for keeping the substrates at a uniform distance from each other.

This arrangement of the present embodiment ensures reduction of the photoprocessing operations in number as compared with the case where the light blocking layer and the spacers are formed independently, thereby resulting in that the costs are lowered.

More specifically, if the light blocking layer and the spacers are independently formed, the photoprocessing operation is carried out for every patterning, i.e., (i) the patterning for forming the light blocking layer in which the black matrix is formed, (ii) the patterning for forming the transparent electrodes, and (iii) the patterning for forming the metal wires. Thus, in the liquid crystal display device producing process, the photoprocessing operation has to be carried out three times in total with respect to one substrate. Since the same patterning operations are required as to the counter substrate, six photoprocessing operations in total are needed to be conducted with respect to both the substrates. Furthermore, since the spacers for control of cell thickness are also formed by photoprocessing, consequently seven photoprocessing operations in total are required.

In the present embodiment, however, provision of the insulating layer 71 serving as the light blocking layer as well as the spacers ensures that the photoprocessing operations are reduced to six in number, which means that the photoprocessing operations are decreased by one.

The following description will explain a method for forming the electrode substrate 70.

The method for forming the metal wires 3 and the transparent electrodes 4 on the transparent substrate 2 is the same as that of the first embodiment.

After forming the transparent electrodes 4, photosensitive resin (V-259BK, available from the Nippon Steel Chemical Co., Ltd.) was deposited thereon into a film, which was subjected to patterning at a width of 25 $\mu$m, and thereafter to annealing at 200° C., whereby an insulating layer 71 was formed to a height of 2 $\mu$m.

Subsequently, the conductive resin layers 5 were formed on the transparent electrodes 4 by the micell electrolytic method. In the micell electrolytic method, 5 litter of a conductive particle colloid aqueous solution for electrodeposition was prepared using 100 g of ITO with a particle diameter of 0.2 $\mu$m as conductive particles, 15 g of ferrocene PEG as a surfactant, and 50 g of a supporting electrolyte composed of LiBr, and the solution was put in an electrolysis vessel 20 shown in FIG. 4(a). As shown in the figure, in the solution, the conductive particles 21 were surrounded by the surfactant 22. The foregoing substrate 2 with the metal wires 3 and the transparent electrodes 4 formed thereon was placed in the electrolysis vessel 20, so that conductive particles 21 were electrodeposited on the transparent electrodes 4 on the substrate 2. For electric connection of the substrate 2 with an external power source 23, an electrodeposition-use electrode 24 was formed with silver paste (STR-9470, available from Chemitoron Co., Ltd.). As a counter electrode 25, an electrode made of stainless steel was used. A voltage of 1 V was applied from the external power source 23 for 5 minutes to break the micell so that the conductive particles 21 were deposited on the transparent electrodes 4. As a result, the conductive particles 21 were deposited to a thickness of about 0.5 $\mu$m on the transparent electrodes 4.

By the foregoing electrodeposition method, even if projections 26 (see FIG. 6) are formed on the transparent electrodes 4, a flat surface can be obtained since a ratio of the conductive particles 21 adhering to the projections 26 is low.

Here, in the case where the conductive particles 21 are deposited to a thickness of not less than 0.05 $\mu$m, level differences in the layer composed of the conductive particles 21 become not more than 0.05 $\mu$m, thereby causing affect of the projections 26 of the transparent electrodes 4 to be reduced. On the other hand, it was found that a quantity of transmitted light is reduced to 60 percent in the case where the conductive particles are electrodeposited to a thickness exceeding 5 $\mu$m, and that therefore lamination to a thickness exceeding 5 $\mu$m is inappropriate.

Subsequently, as shown in FIG. 6, resin 30 was applied thereto to a thickness of about 200 nm, and was subjected to annealing at 200° C. for thermal hardening so as to become hardened. Overcoat-use resin (trade name: HP-1009-IM6) available from Hitachi Chemical Co., Ltd. may be used as the resin 30. The resin 30, thus coming to contain the conductive particles 21, became conductive, whereby conductive resin layers 5 were formed.

Subsequently, a silicon dioxide (SiO$_2$) insulating film with a thickness of 20 nm and a polyimide alignment film with a thickness of 20 nm were formed thereon in this order, and a uniaxial alignment processing by rubbing was applied to the alignment film, whereby the coating film 7 was completed.

The thus formed electrode substrate 70 and another substrate produced in a manner in accordance with any one of the first through third embodiments were combined facing each other in a manner such that the insulating layer 71 serving as the spacers as well came therebetween, and ferroelectric liquid crystal was injected into therebetween, whereby a display device was completed. The resultant ferroelectric liquid crystal display device underwent neither line defects nor vertical leakage, and excelled in display performance.

Incidentally, as shown in FIG. 11, the conductive color filter layers 41 may replace the conductive resin layers 5.

Fifth Embodiment

Figure 12:
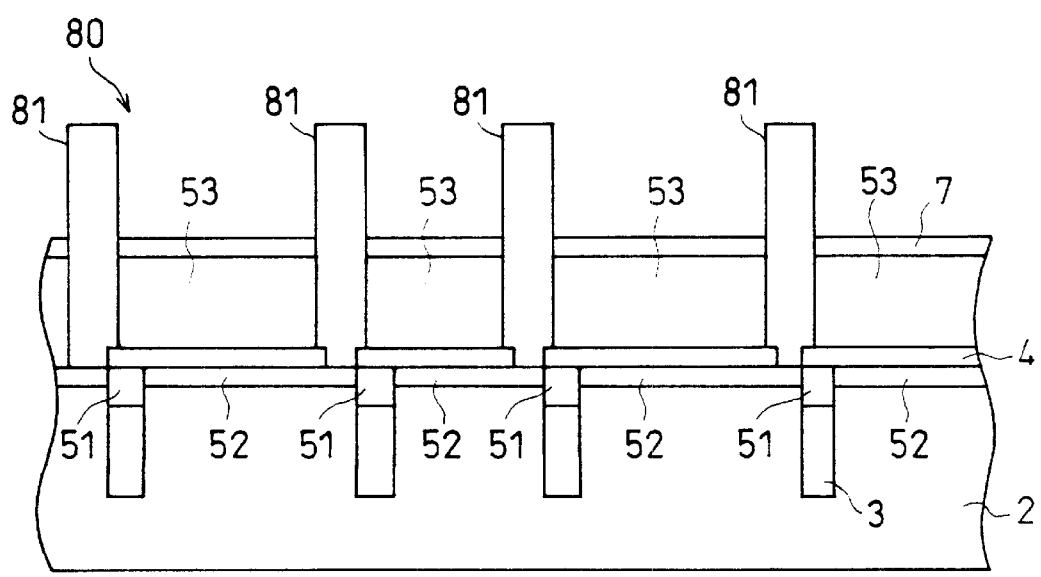
FIG. 12 is a cross-sectional view schematically illustrating electrode structures of an electrode substrate for use in a liquid crystal display device in accordance with still another embodiment of the present invention.
Figure 13:
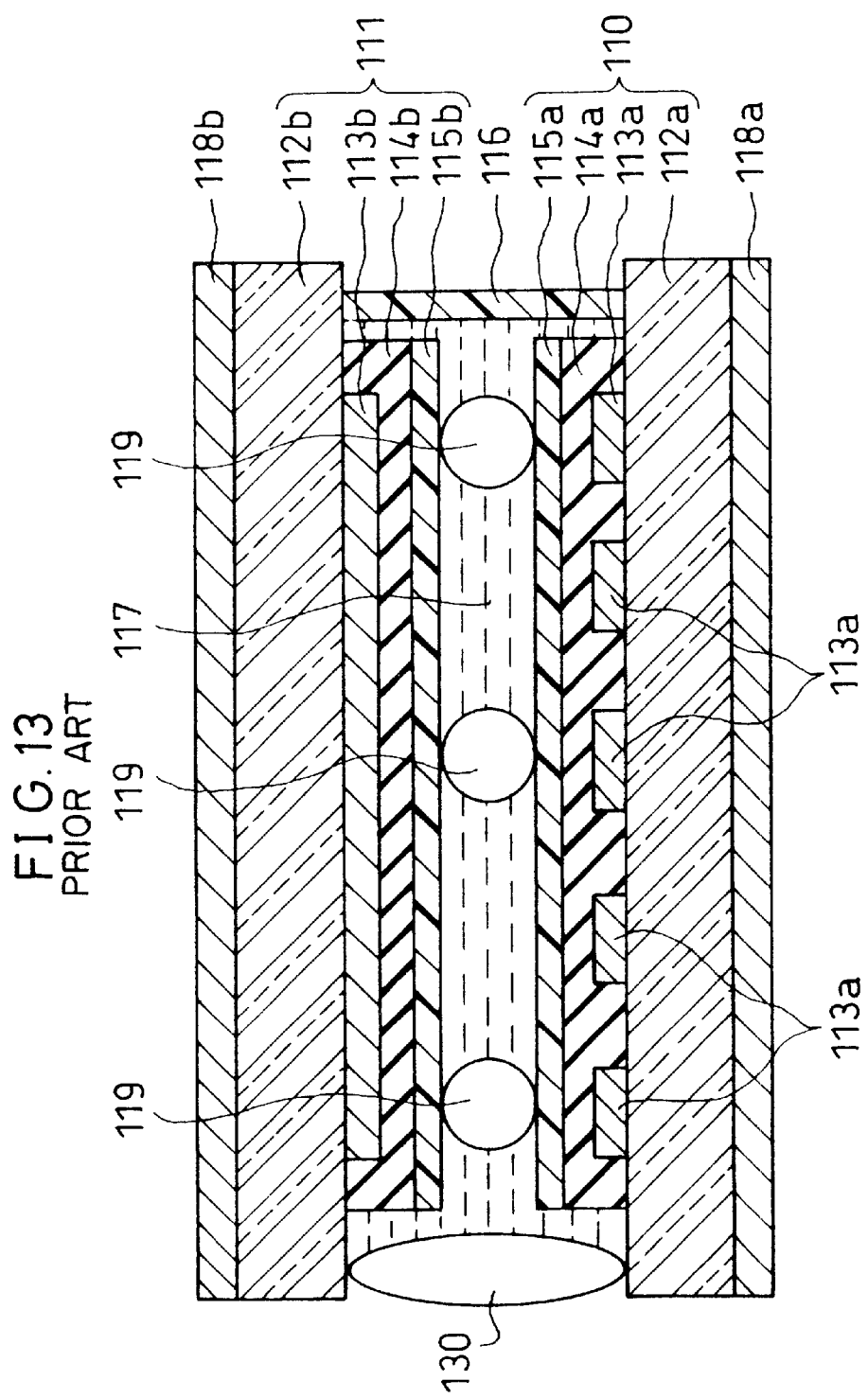
FIG. 13 is a cross-sectional view illustrating a schematic arrangement of a conventional ferroelectric liquid crystal display device.
Figure 14:
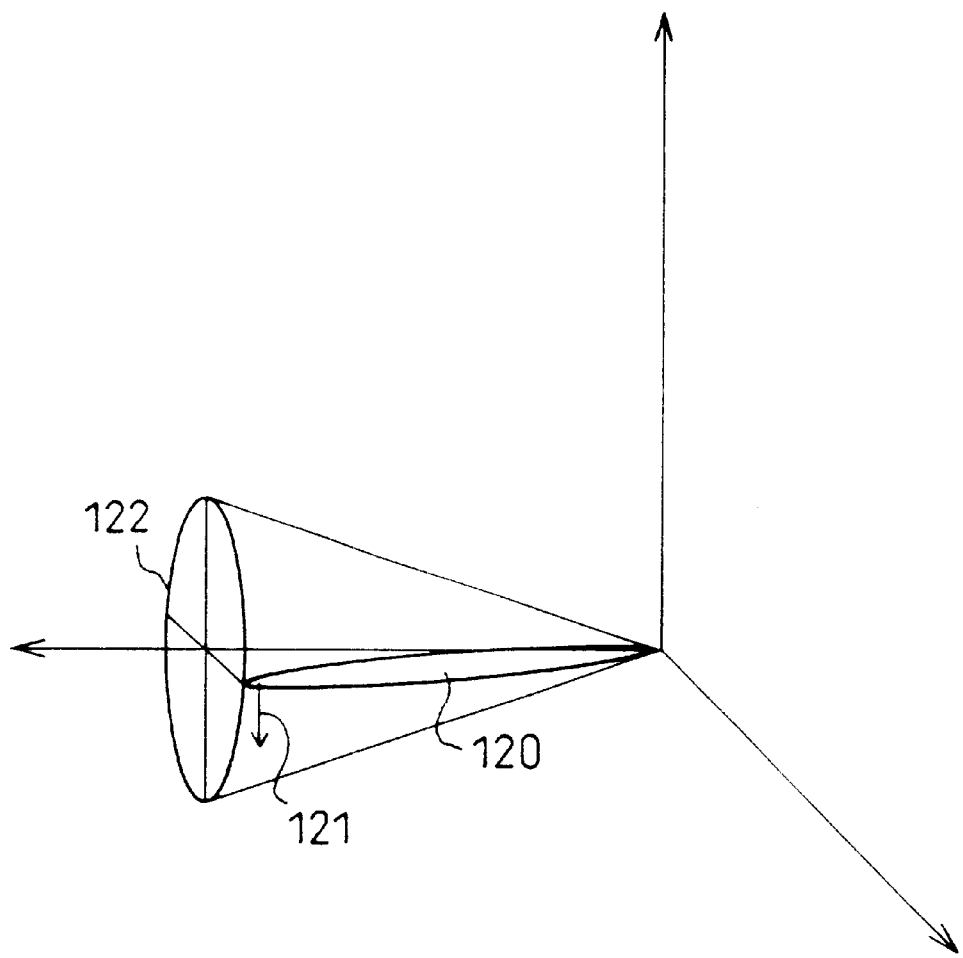
FIG. 14 is a view explaining how ferroelectric liquid crystal molecules respond to an electric field.
Figure 15:
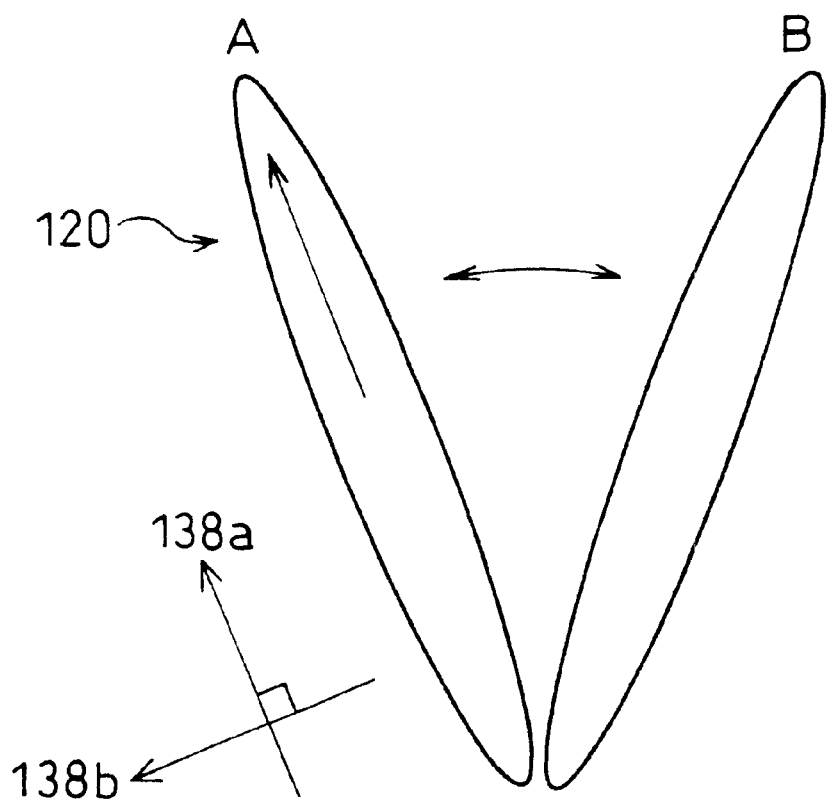
FIG. 15 is a view explaining switching behaviors of the ferroelectric liquid crystal molecules.

The following description will explain still another embodiment of the present invention, while referring to FIG. 12. Incidentally, the members having the same structure (function) as those shown in the figures in conjunction with the above-mentioned embodiment will be designated by the same reference numerals and their description will be omitted.

An electrode substrate 80 of the present embodiment differs from the electrode substrate 50 of the third embodiment in that the electrode substrate 80 includes, in the place of the light blocking layer 6 and the spacers 8, an insulating layer 81 serving as the light blocking layer and the spacers. In other words, in the present embodiment, the insulating layer 81 serves as a light blocking layer called "black" for preventing light exchange between the transparent electrodes 4, as well as serves as the spacers for keeping the substrates at a uniform distance from each other.

This arrangement of the present embodiment, as in the case of the fourth embodiment, ensures reduction of the photoprocessing operations in number as compared with the case where the light blocking layer and the spacers are formed independently, thereby resulting in that the costs are lowered.

The following description will explain a method for forming the foregoing electrode substrate 80.

First of all, the metal wires 3, the conductive resin layers 51, the transparent resin layers 52, and the transparent electrodes 4 are formed in the same manner as that in the case of the third embodiment.

After the formation of the transparent electrodes 4, photosensitive resin (V-259BK, available from the Nippon Steel Chemical Co., Ltd.) was deposited thereon into a film, which was subjected to patterning at a width of 25 $\mu$m, and thereafter to annealing at 200° C., whereby an insulating layer 81 was formed to a height of 2 $\mu$m.

Subsequently, conductive layers 53 were formed on the transparent electrodes 4. In the case where the conductive resin layers 5 of the first embodiment are to be formed as conductive layers 53, the micell electrolytic method which is explained in the description of the first embodiment is used for forming the conductive resin layers 5. In the case where the conductive color filter layers 41 of the second embodiment are to be formed as conductive layers 53, the micell electrolytic method which is explained in the description of the second embodiment is used for forming the conductive color filter layers 41.

More specifically, to form the conductive layers 53, the conductive particles 21 (or the conductive particles 21 plus the pigment particles 42) are electrodeposited on the transparent electrodes 4 by any one of the aforementioned manners based on the micell electrolytic method.

By the foregoing electrodeposition method, even if projections 26 (see FIG. 6) are formed on the transparent electrodes 4, a flat surface can be obtained since a ratio of the conductive particles 21 adhering to the projections 26 is low.

Here, in the case where the conductive particles 21 are deposited to a thickness of not less than 0.05 µm, level differences in the layer composed of the conductive particles 21 become not more than 0.05 µm, thereby causing affect of the projections 26 of the transparent electrodes 4 to be reduced. On the other hand, it was found that a quantity of transmitted light is reduced to 60 percent in the case where the conductive particles are electrodeposited to a thickness exceeding 5 µm, and that therefore lamination to a thickness exceeding 5 µm is inappropriate.

Subsequently, as shown in FIG. 6, resin 30 was applied thereon to a thickness of about 200 nm, and was subjected to annealing at 200° C. for thermal hardening so as to become hardened. Overcoat-use resin (trade name: HP-1009-IM6) available from Hitachi Chemical Co., Ltd. may be used as the resin 30. The resin 30, thus coming to contain the conductive particles 21, became conductive, whereby conductive layers 53 were formed.

Through the foregoing process, the electrode structures each composed of the metal wire 3, the conductive resin layer 51, the transparent electrode 4, and the conductive layer 53 are formed. Also laminar structures each composed of the transparent resin layer 52, the transparent electrode 4, and the conductive layer 53 are formed.

Subsequently, a silicon dioxide ($SiO_2$) insulating film with a thickness of 20 nm and a polyimide alignment film with a thickness of 20 nm were formed thereon in this order, and a uniaxial alignment processing by rubbing was applied to the alignment film, whereby the coating film 7 was completed.

The thus formed electrode substrate 80 and another substrate produced in a manner in accordance with any one of the first through third embodiments and were combined facing each other in a manner such that the insulating layer 81 serving as the spacers as well came therebetween, and ferroelectric liquid crystal was injected into therebetween, whereby a display device was completed. The resultant ferroelectric liquid crystal display device underwent neither line defects nor vertical leakage, and excelled in display performance.

A liquid crystal display device in accordance with the present invention may be arranged so that the substrate has thereon an electrode structure composed of a metal electrode made of the metal material, a transparent electrode made of the transparent electrode material, and a conductive resin layer, which are laminated in this order.

According to the foregoing arrangement, at least either the scanning electrodes or the signal electrodes have a trilaminar structure each, thereby ensuring that the following effect can be achieved. Namely, low resistance and excellent surface flatness can be realized, while occurrence of line defects can be avoided.

The liquid crystal display device in accordance with the present invention may be further arranged so that the substrate has thereon an electrode structure composed of a metal electrode made of the metal material, a transparent electrode made of the transparent electrode material, and a conductive color filter layer, which are laminated in this order.

According to the foregoing arrangement, at least either the scanning electrodes or the signal electrodes have a trilaminar structure each, thereby ensuring that the following effect can be achieved. Namely, low resistance, excellent surface flatness, and color filter function can be realized, while occurrence of line defects can be avoided.

The liquid crystal display device in accordance with the present invention may be further arranged so that the metal electrode is provided in a groove preliminarily formed on the substrate.

With the foregoing arrangement, the following effect can be achieved: even in the case where the metal electrodes underneath are formed so as to each have a width narrower than that of the transparent electrodes, surface flatness can be ensured.

The liquid crystal display device in accordance with the present invention may be further arranged so that the electrode structure further includes a second conductive resin layer for electric connection, provided between the metal electrode and the transparent electrode.

With the foregoing arrangement, the following effect can be achieved: the presence of the second conductive resin layer prevents erosion of metal during the etching with respect to the transparent electrode material in the step of forming the transparent electrodes. This liquid crystal display device may be further arranged so that the electrode structure further includes a transparent resin layer under the transparent electrode. With this arrangement, an effect that the second conductive resin layers and the transparent resin layers are formed flat thereby ensuring surface flatness can be further achieved.

The liquid crystal display device in accordance with the present invention may be further arranged so that not less than two selected from the group consisting of Ta, Cr, Ni, Ti, Cu, and Al are used as the metal material.

With the foregoing arrangement, the following effect can be achieved: since a metal resistant against erosion by an etching liquid used for forming the transparent electrodes is used along with a metal of low resistance, the erosion of metal during the etching for forming the transparent electrodes can be avoided.

The liquid crystal display device in accordance with the present invention may be further arranged so that either ITO whose crystallinity is amorphus, or ITO containing at least an oxide of Zn, is used as the transparent electrode material.

With the foregoing arrangement, the etching speed for formation of the transparent electrodes can be raised to about ten times that in the case of polycrystalline ITO, thereby enabling effective etching even with an etching liquid with weak acidity. Therefore, an effect that erosion of metal can be suppressed is achieved.

The liquid crystal display device in accordance with the present invention may be further arranged so that the conductive resin layer or the conductive color filter layer has a thickness in a range of not less than 0.05 µm to not more than 5 µm.

With the foregoing arrangement, an effect of burying the projections formed on the transparent electrodes so as to achieve surface flatness and suppressing the lowering of the transmitted light can be achieved. Moreover, this liquid crystal display device may be further arranged so that the electrode structure further includes a transparent resin layer under the transparent electrode. With this arrangement, an effect of ensuring translucency and surface flatness can be further achieved.

The liquid crystal display device in accordance with the present invention may be further arranged so that a plurality of the transparent electrodes are formed, and the insulating layer is provided so as to cover spaces between the transparent electrodes.

With the foregoing arrangement, an effect that the insulating layer prevents light exchange between pixels can be achieved.

A method for manufacturing a liquid crystal display device in accordance with the present invention may be arranged so that ITO, Ta, Mo, or Cr is used as conductive particles in the step of forming either the conductive resin layer, the conductive color filter layer, or the second conductive resin layer.

By the foregoing method, the following effect can be achieved: the use of the foregoing conductive particles enables formation of a desired conductive layer (the conductive resin layer, the conductive color filter layer, or the second conductive resin layer) on each electrode by the micell electrolytic method.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display device provided with a substrate on which scanning electrodes are laid and a substrate on which signal electrodes are laid, said substrates separated by a liquid crystal layer,
   wherein said scanning electrodes or said signal electrodes, or both of the same have an electrode structure including a metal electrode made of a metal material, a transparent electrode made of a transparent electrode material, and a conductive resin layer,
   wherein the metal electrode, the transparent electrode, and the conductive resin layer are laminated, and the metal electrode is provided along a length of the transparent electrode.

2. The liquid crystal display device as set forth in claim 1, wherein either ITO whose crystallinity is amorphous, or ITO containing at least an oxide of Zn, is used as said transparent electrode material.

3. A liquid crystal display device provided with a substrate on which scanning electrodes are laid and a substrate on which signal electrodes are laid, said substrates separated by a liquid crystal layer,
   wherein said scanning electrodes or said signal electrodes, or both of the same have an electrode structure including a metal electrode made of a metal material, a transparent electrode made of a transparent electrode material, and a conductive color filter layer,
   wherein the metal electrode, the transparent electrode, and the conductive color filter layer are laminated, and the metal electrode is provided along a length of the transparent electrode.

4. The liquid crystal display device as set forth in claim 3, wherein either ITO whose crystallinity is amorphous, or ITO containing at least an oxide of Zn, is used as said transparent electrode material.

5. A liquid crystal display device provided with a substrate on which scanning electrodes are laid and a substrate on which signal electrodes are laid, said substrates separated by a liquid crystal layer, wherein:
   a metal material, a transparent electrode material, and a conductive resin are used for forming either said scanning electrodes or said signal electrodes, or each of the same,
   wherein said substrate has thereon an electrode structure composed of a metal electrode made of said metal material, a transparent electrode made of said transparent electrode material, and a conductive resin layer, which are laminated in this order.

6. The liquid crystal display device as set forth in claim 5, wherein said metal electrode is provided in a groove preliminarily formed on said substrate.

7. The liquid crystal display device as set forth in claim 5, wherein said electrode structure further includes a second conductive resin layer for electric connection, said second conductive resin layer being provided between said metal electrode and said transparent electrode.

8. The liquid crystal display device as set forth in claim 7 further includes a transparent resin layer under said transparent electrode.

9. The liquid crystal display device as set forth in claim 5, wherein said conductive resin layer has a thickness in a range of not less than 0.05 $\mu$m to not more than 5 $\mu$m.

10. The liquid crystal display device as set forth in claim 5, wherein:
    a metal layer containing a metal material selected from the group consisting of Cu and Al, and a metal layer containing a metal material selected from the group consisting of Ta, Cr, Ti, and Ni, are laminated on said substrate in this order, to constitute said metal electrode.

11. A liquid crystal display device provided with a substrate on which scanning electrodes are laid and a substrate on which signal electrodes are laid, said substrates separated by a liquid crystal layer, wherein:
    a metal material, a transparent electrode material, and a conductive color filter are used for forming either said scanning electrodes or said signal electrodes, or each of the same,
    wherein said substrate has thereon an electrode structure composed of a metal electrode made of said metal material, a transparent electrode made of said transparent electrode material, and a conductive color filter layer, which are laminated in this order.

12. The liquid crystal display device as set forth in claim 11, wherein said metal electrode is provided in a groove preliminarily formed on said substrate.

13. The liquid crystal display device as set forth in claim 11, wherein said electrode structure further includes a conductive resin layer for electric connection, said conductive resin layer being provided between said metal electrode and said transparent electrode.

14. The liquid crystal display device as set forth in claim 13 further includes a transparent resin layer under said transparent electrode.

15. The liquid crystal display device as set forth in claim 11, wherein said conductive color filter layer has a thickness in a range of not less than 0.05 $\mu$m to not more than 5 $\mu$m.

16. The liquid crystal display device as set forth in claim 11, wherein:
    a metal layer containing a metal material selected from the group consisting of Cu and Al, and a metal layer containing a metal material selected from the group consisting of Ta, Cr, Ti, and Ni, are laminated on said substrate in this order, to constitute said metal electrode.

17. A liquid crystal display device provided with a substrate on which scanning electrodes are laid and a substrate on which signal electrodes are laid, said substrates separated by a liquid crystal layer, wherein:
   a metal material, a transparent electrode material, and a conductive resin are used for forming either said scanning electrodes or said signal electrodes, or each of the same,
   wherein not less than two selected from the group consisting of Ta, Cr, Ni, Ti, Cu, and Al are used as said metal material.

18. A liquid crystal display device provided with a substrate on which scanning electrodes are laid and a substrate on which signal electrodes are laid, said substrates separated by a liquid crystal layer, wherein:
   a metal material, a transparent electrode material, and a conductive color filter are used for forming either said scanning electrodes or said signal electrodes, or each of the same,
   wherein not less than two selected from the group consisting of Ta, Cr, Ni, Ti, Cu, and Al are used as said metal material.

19. A liquid crystal display device comprising:
   a substrate on which scanning electrodes are laid; and
   a substrate on which signal electrodes are laid, said substrates separated by a liquid crystal layer, wherein:
      each of either said scanning electrodes or said signal electrodes, or both of the same, has an electrode structure composed of at least a transparent electrode and a conductive resin layer which are laminated in this order; and
      an insulating layer serving as a light blocking layer and as a spacer is provided on at least one of said substrates, and
      further comprising a transparent resin layer under said transparent electrode.

20. A liquid crystal display device comprising:
   a substrate on which scanning electrodes are laid; and
   a substrate on which signal electrodes are laid, said substrates separated by a liquid crystal layer, wherein:
      each of either said scanning electrodes or said signal electrodes, or both of the same, has an electrode structure composed of at least a transparent electrode and a conductive color filter layer which are laminated in this order; and
      an insulating layer serving as a light blocking layer and as a spacer is provided on at least one of said substrates, and
      further comprising a transparent resin layer under said transparent electrode.

21. A method for manufacturing a liquid crystal display device provided with a substrate on which scanning electrodes are laid and a substrate on which signal electrodes are laid, said substrates separated by a liquid crystal layer, either the scanning electrodes or the signal electrodes, or each of the same being formed with a metal material, a transparent electrode material, and a conductive resin, the substrate having an electrode structure composed of a metal electrode made of the metal material, a transparent electrode made of the transparent electrode material, and a conductive resin layer which are laminated in this order, the method comprising the step of:
   subjecting a surface of the conductive resin layer to either pressing or polishing, or both of the same, so as to improve flatness of the surface of the conductive resin layer.

22. A method for manufacturing a liquid crystal display device provided with a substrate on which scanning electrodes are laid and a substrate on which signal electrodes are laid, said substrates separated by a liquid crystal layer, either the scanning electrodes or the signal electrodes, or each of the same being formed with a metal material, a transparent electrode material, and a conductive color filter, the substrate having an electrode structure composed of a metal electrode made of the metal material, a transparent electrode made of the transparent electrode material, and a conductive color filter layer, which are laminated in this order, the method comprising the step of:
   subjecting a surface of the conductive color filter layer to either pressing or polishing, or both of the same, so as to improve flatness of the surface of the conductive color filter layer.

23. A method for manufacturing a liquid crystal display device provided with a substrate on which scanning electrodes are laid and a substrate on which signal electrodes are laid, said substrates separated by a liquid crystal layer, either the scanning electrodes or the signal electrodes, or each of the same being formed with a metal material, a transparent electrode material, and a conductive resin, the substrate having an electrode structure composed of a metal electrode made of the metal material, a transparent electrode made of the transparent electrode material, and a conductive resin layer which are laminated in this order, the method comprising the step of:
   forming the conductive resin layer by applying the micell electrolytic method.

24. The method as set forth in claim 23, wherein ITO, Ta, Mo, or Cr is used as conductive particles, in said step of forming the conductive resin layer.

25. A method for manufacturing a liquid crystal display device provided with a substrate on which scanning electrodes are laid and a substrate on which signal electrodes are laid, said substrates separated by a liquid crystal layer, either the scanning electrodes or the signal electrodes, or each of the same being formed with a metal material, a transparent electrode material, and a conductive color filter, the substrate having an electrode structure composed of a metal electrode made of the metal material, a transparent electrode made of the transparent electrode material, and a conductive color filter layer, which are laminated in this order, the method comprising the step of:
   forming the conductive color filter layer by applying the micell electrolytic method.

26. The method as set forth in claim 25, wherein ITO, Ta, Mo, or Cr is used as conductive particles, in said step of forming the conductive color filter layer.

27. A method for manufacturing a liquid crystal display device provided with a substrate on which scanning electrodes are laid and a substrate on which signal electrodes are laid, said substrates separated by a liquid crystal layer, either the scanning electrodes or the signal electrodes, or each of the same being formed with a metal material, a transparent electrode material, and a conductive resin, the substrate having an electrode structure composed of a metal electrode made of the metal material, a transparent electrode made of the transparent electrode material, and a conductive resin layer which are laminated in this order, the electrode structure further including a second conductive resin layer for electric connection, said second conductive resin layer being provided between the metal electrode and the transparent electrode, the method comprising the step of:
   forming the second conductive resin layer by applying the micell electrolytic method.

28. The method as set forth in claim 27, wherein ITO, Ta, Mo, or Cr is used as conductive particles, in said step of forming the second conductive resin layer.

29. A method for manufacturing a liquid crystal display device provided with a substrate on which scanning electrodes are laid and a substrate on which signal electrodes are laid, said substrates separated by a liquid crystal layer, either the scanning electrodes or the signal electrodes, or each of the same being formed with a metal material, a transparent electrode material, and a conductive color filter, the substrate having an electrode structure composed of a metal electrode made of the metal material, a transparent electrode made of the transparent electrode material, and a conductive color filter layer, which are laminated in this order, the electrode structure further including a conductive resin layer for electric connection, said conductive resin layer being provided between the metal electrode and the transparent electrode, the method comprising the step of:

forming the conductive resin layer by applying the micell electrolytic method.

30. The method as set forth in claim 29, wherein ITO, Ta, Mo, or Cr is used as conductive particles, in said step of forming the conductive resin layer.

* * * * *